US010253676B2

(12) United States Patent
Gossling et al.

(10) Patent No.: US 10,253,676 B2
(45) Date of Patent: Apr. 9, 2019

(54) MOLDED ROTOR FOR COOLING FAN MOTOR

(71) Applicant: MAGNA POWERTRAIN BAD HOMBURG GMBH, Bad Homburg (DE)

(72) Inventors: Axel Gossling, Alzenau (DE); Michael Ciop, Braunschweig (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 463 days.

(21) Appl. No.: 14/572,018

(22) Filed: Dec. 16, 2014

(65) Prior Publication Data

US 2015/0176596 A1 Jun. 25, 2015

Related U.S. Application Data

(60) Provisional application No. 61/953,969, filed on Mar. 17, 2014, provisional application No. 61/919,147, filed on Dec. 20, 2013.

(51) Int. Cl.

| | |
|---|---|
| *F04D 25/06* | (2006.01) |
| *F01P 1/06* | (2006.01) |
| *H02K 1/27* | (2006.01) |
| *H02K 5/00* | (2006.01) |
| *H02K 5/22* | (2006.01) |

(Continued)

(52) U.S. Cl.
CPC .............. *F01P 1/06* (2013.01); *F04D 25/064* (2013.01); *F04D 29/023* (2013.01); *F04D 29/329* (2013.01); *H02K 1/2786* (2013.01); *H02K 5/00* (2013.01); *H02K 5/225* (2013.01); *H02K 7/14* (2013.01); *H02K 21/22* (2013.01); *F05D 2300/43* (2013.01); *F05D 2300/507* (2013.01)

(58) Field of Classification Search
CPC .. F04D 25/064; F04D 29/023; F04D 29/0329; F04D 29/002; F04D 29/02; F04D 29/026; F01P 1/06
See application file for complete search history.

(56) References Cited

U.S. PATENT DOCUMENTS

| | | |
|---|---|---|
| 1,538,196 A | 5/1925 | Varley |
| 4,548,548 A | 10/1985 | Gray, III |

(Continued)

FOREIGN PATENT DOCUMENTS

WO    WO2014020756    2/2014

*Primary Examiner* — Essama Omgba
*Assistant Examiner* — Philip E Stimpert
(74) *Attorney, Agent, or Firm* — Honigman LLP

(57) ABSTRACT

A cooling fan assembly operable for cooling a radiator of a vehicle includes a brushless motor and a fan element having a plurality of fan blades. The brushless motor includes a stator and a rotor. The fan element is attached at the rotor such that rotation of the rotor by the motor imparts rotation of the fan blades to enhance air flow at the radiator of the vehicle. The rotor is a molded polymeric rotor formed by injection molding a thermoplastic material. During injection molding of the rotor, a plurality of magnetic elements are at least partially overmolded by the thermoplastic material to establish the magnetic elements at the molded polymeric rotor. The rotor may have a bell-like shape, and the magnetic elements may be disposed at an inside facing surface of the rotor.

19 Claims, 39 Drawing Sheets

(51) Int. Cl.
  *H02K 7/14* (2006.01)
  *F04D 29/02* (2006.01)
  *F04D 29/32* (2006.01)
  *H02K 21/22* (2006.01)

(56) References Cited

U.S. PATENT DOCUMENTS

| | | | |
|---|---|---|---|
| 5,543,676 A * | 8/1996 | York | H02K 21/044 |
| | | | 310/152 |
| 5,744,921 A | 4/1998 | Makaran | |
| 5,944,497 A * | 8/1999 | Kershaw | F04D 25/082 |
| | | | 417/368 |
| 6,215,261 B1 | 4/2001 | Becerra | |
| 6,874,990 B2 | 4/2005 | Nadeau | |
| 6,965,212 B1 | 11/2005 | Wang et al. | |
| 7,484,937 B2 | 2/2009 | Johann | |
| 7,811,055 B2 | 10/2010 | Stommel et al. | |
| 2003/0006664 A1 | 1/2003 | Eggers | |
| 2003/0173924 A1 | 9/2003 | Blase et al. | |
| 2004/0104638 A1 | 6/2004 | Yoneda | |
| 2004/0105200 A1 | 6/2004 | Shigeki et al. | |
| 2005/0062494 A1 | 3/2005 | Bu Tanh et al. | |
| 2006/0066169 A1 | 3/2006 | Daugherty | |
| 2007/0207044 A1 * | 9/2007 | Nagamitsu | F04D 25/0613 |
| | | | 417/354 |
| 2008/0224650 A1 | 9/2008 | Ito et al. | |
| 2009/0081036 A1 | 3/2009 | Takeshita et al. | |
| 2010/0272592 A1 * | 10/2010 | Chien | F04D 29/046 |
| | | | 417/423.7 |
| 2012/0074807 A1 * | 3/2012 | Burton | H02K 1/2753 |
| | | | 310/156.28 |
| 2014/0042937 A1 | 2/2014 | Schmidt | |
| 2015/0028781 A1 | 1/2015 | Steigerwald | |
| 2015/0054378 A1 | 2/2015 | Arnoldi et al. | |
| 2015/0130382 A1 | 5/2015 | Schussler | |
| 2015/0176596 A1 | 6/2015 | Gossling et al. | |
| 2016/0363132 A1 | 12/2016 | Havel et al. | |

\* cited by examiner

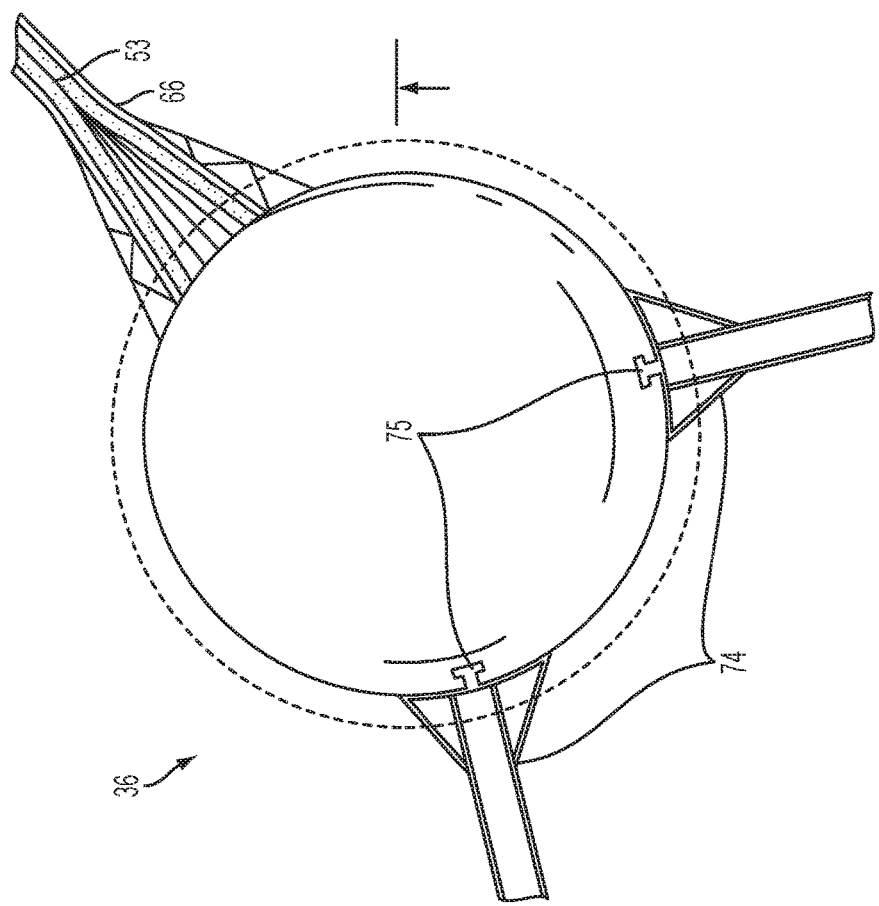

US 10,253,676 B2

MOLDED ROTOR FOR COOLING FAN MOTOR

CROSS REFERENCE TO RELATED APPLICATIONS

The present application is related to U.S. provisional applications Ser. No. 61/953,969, filed Mar. 17, 2014, and Ser. No. 61/919,147, filed Dec. 20, 2013, which are hereby incorporated herein by reference in their entireties.

FIELD OF THE INVENTION

The present invention relates generally to a vehicle cooling fan.

BACKGROUND OF THE INVENTION

Construction parts of known art cooling fan motors are typically nearly completely out of metal. Typically, these are made out of magnetically soft steel plates or steel. There are coils mostly out of copper and permanent magnets out of iron, nickel, cobalt, their alloys, eventually blend with aluminum or silicon. Raw earth magnets may find use, but are not typical materials for this segment. There are both types common, the external rotor motors and the internal rotor motors. A rotor of the described motor type has a metallic bell like shape. The permanent magnets accordingly are mounted at the outer rim of the metallic bell's inside facing in opposition to the solenoids (stator coils).

SUMMARY OF THE INVENTION

The present invention provides an external rotor motor having the permanent magnets mounted in the rotor and having a (steady) stator with solenoid (stator coils) internal. The rotor is for a brushless motor, such as a brushless motor for a cooling fan assembly operable for cooling a radiator of a vehicle. The rotor of the present invention comprises a non-metallic or plastic or polymeric molded rotor (such as a molded polymeric rotor formed via injection molding). During forming (such as injection molding) of the polymeric rotor, a plurality of magnetic elements are at least partially overmolded by the molding material (such as a thermoplastic material or engineering plastic or the like) to establish the magnetic elements at the formed or molded polymeric rotor.

The present invention may not be limited to external rotor motors but may also apply to internal rotor motors. The rotor and motor of the present invention is suitable for use in a cooling fan assembly of a vehicle, but aspects of the rotor of the present invention are suitable for other motor applications.

These and other objects, advantages, purposes and features of the present invention will become apparent upon review of the following specification in conjunction with the drawings.

BRIEF DESCRIPTION OF THE DRAWINGS

FIG. 33 shows a stator with one non detachable main stator arm guiding the cable and two attached stator arm with a T shape slot form fit connection to the stator body in different angles to another.

Figure 1:
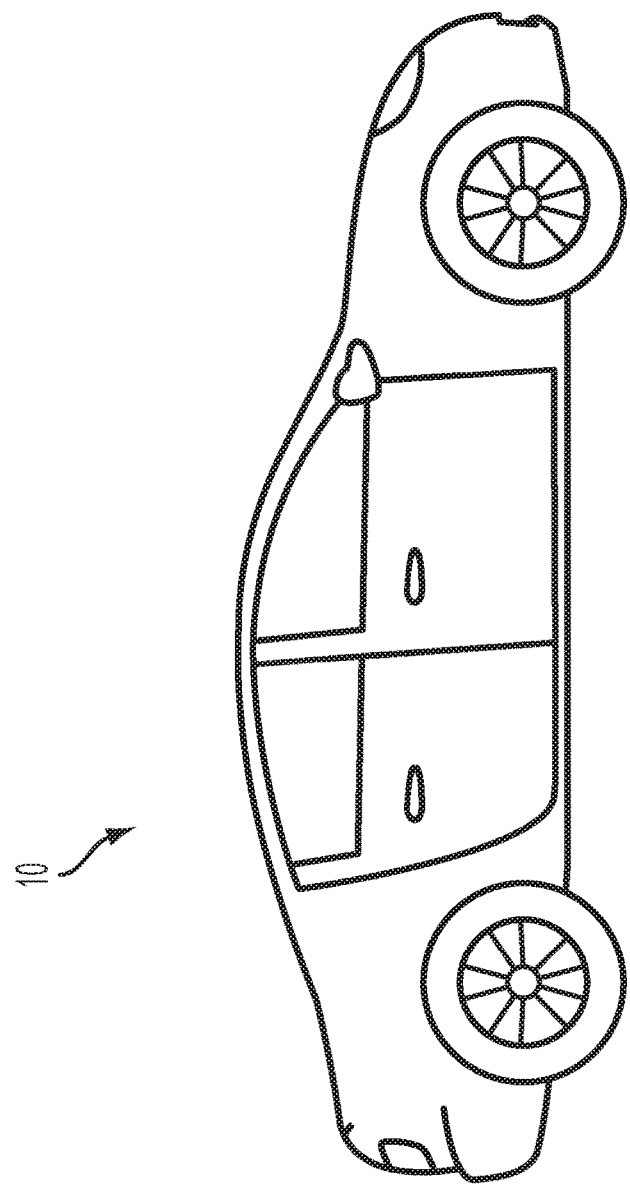
FIG. 1 is a perspective view of a vehicle with a cooling fan assembly that incorporates a rotor in accordance with the present invention.

LEGEND 21 rotor metal inlay
22 injection molded component
23 rear magnets metal inlay
24 permanent magnets
25 solenoid
28 screw hole for fan fixation by a separate screw (thread or nut in the wheel)
29 thread for fan fixation by a separate screw
30 bearing
31 rotor bell (metal)
32 rotor axis
33 electrolyte capacitor
34 permanent magnets
35 solenoid
36 stator
37 longitudinal bearing fixation
38 lateral bearing fixation
39 screw hole for fan fixation
40 air hole
50 shroud
51 hub
52 stator struts
53 cable
54 connector
55 cooling fan
56 fan blades
57 air holes
58 fixation holes
59 flaps
60 mounting ring
61 motor electronic cover lid
62 shroud mounting bracket
63 stator fixation screws
66 stator integrated struts (stator arms)
67 rotor hub enforcement ribs
68 rotor hub enforcement ring
69 motor electronic compartment
71 stator integrated struts (stator arms) fixation hole
72 barrel
73 outer fan ring
74 stator attachable struts (attachable stator arms)
75 T shape attaching slot
r31 radius of motor bell (outer surface)
r51$i$ radius of the hub's molding structure inner surface
r31$o$ radius of the hub's molding structure outer surface In the drawings, the known metallic rotor or bell is referenced at 31' (FIGS. 8, 9A, 10A, 11 and 12) and the non-metallic rotor or bell of the present invention is referenced at 31 (FIGS. 5-7, 9B and 9C). Some of the elements and components of the motors and rotors are similar between the known design and the present invention, and are referenced in the drawings with similar or same reference numbers.

DESCRIPTION OF THE PREFERRED EMBODIMENTS

Figure 2:
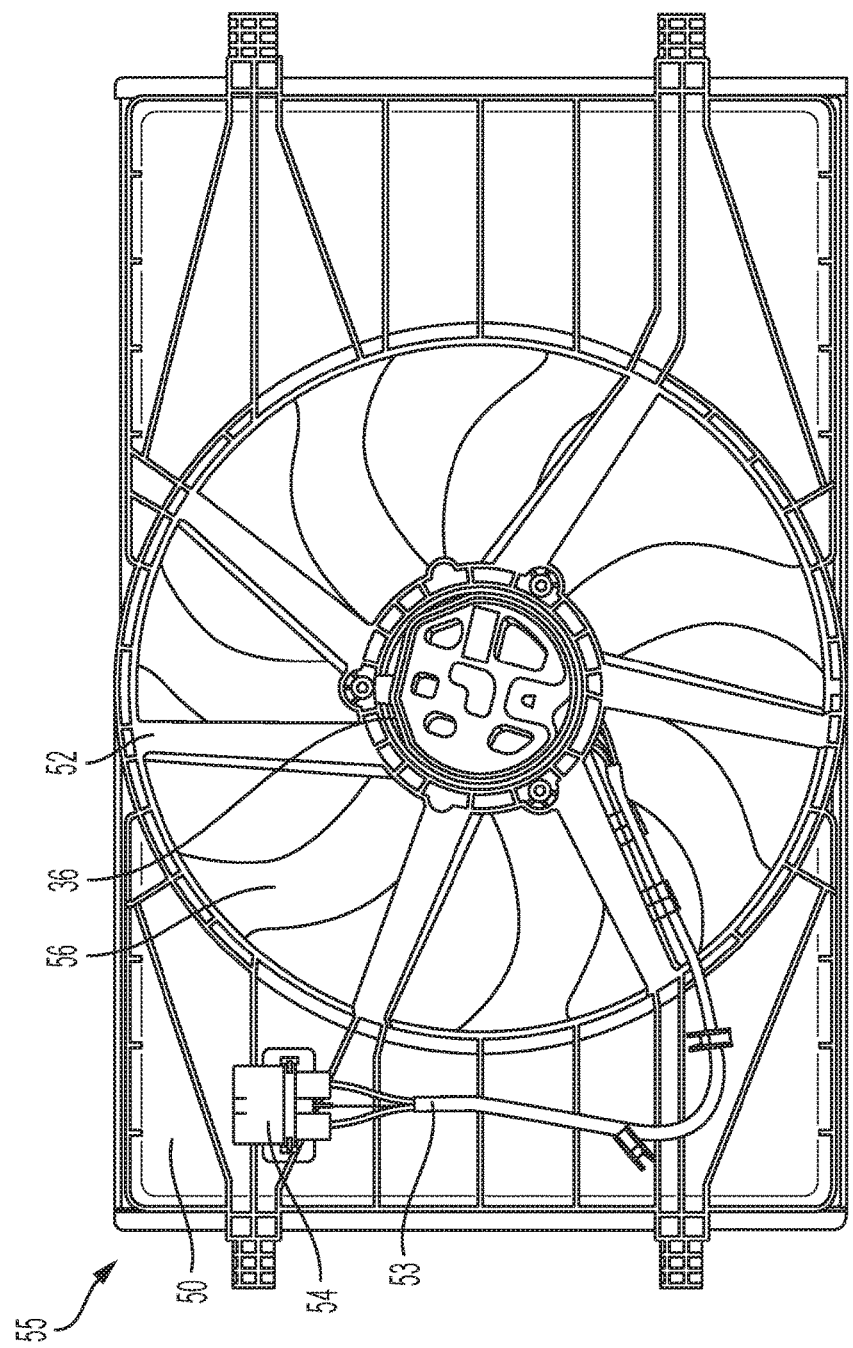
FIG. 2 is a plan view of a cooling fan assembly suitable for use with a rotor of the present invention.
Figure 3:
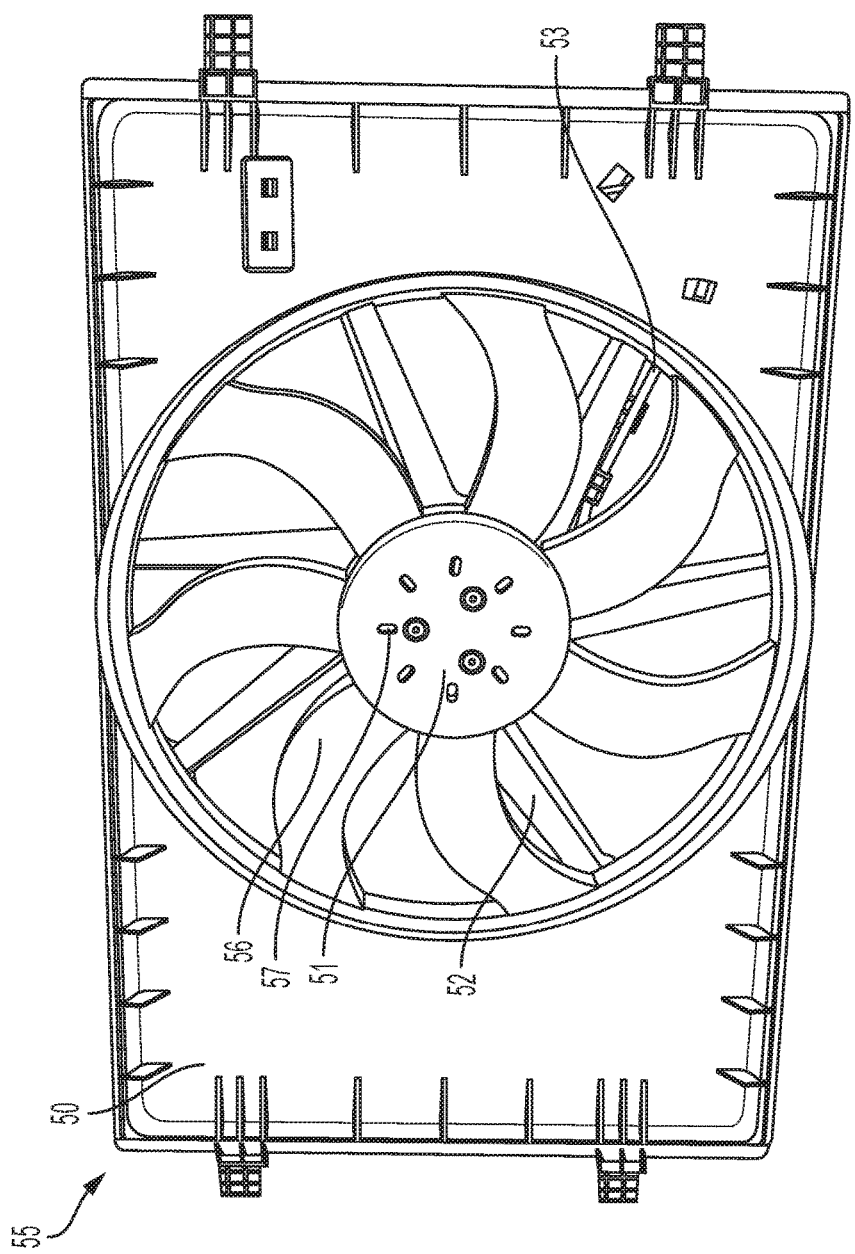
FIG. 3 is an opposite plan view of the cooling fan assembly of FIG. 2.
Figure 4:
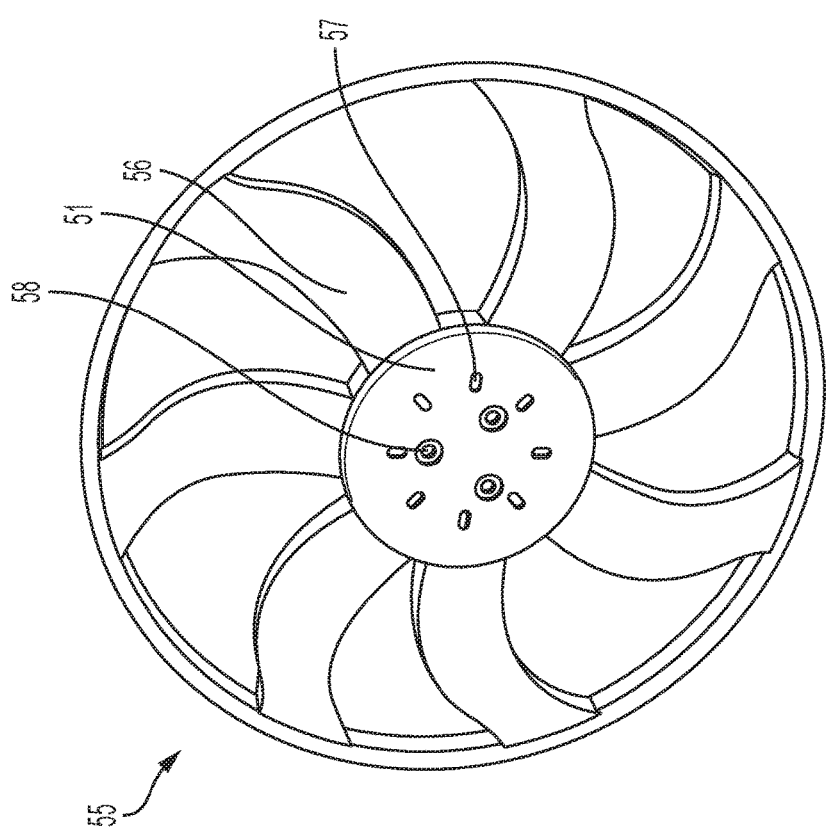
FIG. 4 is a perspective view of a fan element of the cooling fan assembly.

Referring now to the drawings and the illustrative embodiments depicted therein, a cooling fan motor for a cooling fan 55 of a vehicle 10 has a plastic or non-metallic molded rotor or bell 31 (FIGS. 1-9C). The rotor 31 has a bell like shape, with permanent magnets 24 disposed at the inside facing surface of the bell 31 in opposition to the solenoids (stator coils). When assembled as shown in FIGS. 2 and 3, a cooling fan is fixated at the top (front area) of the rotor bell 31, preferably by screws which reach through 28, 29 accordingly (such as can be seen in FIGS. 3-6B).

Figure 5:
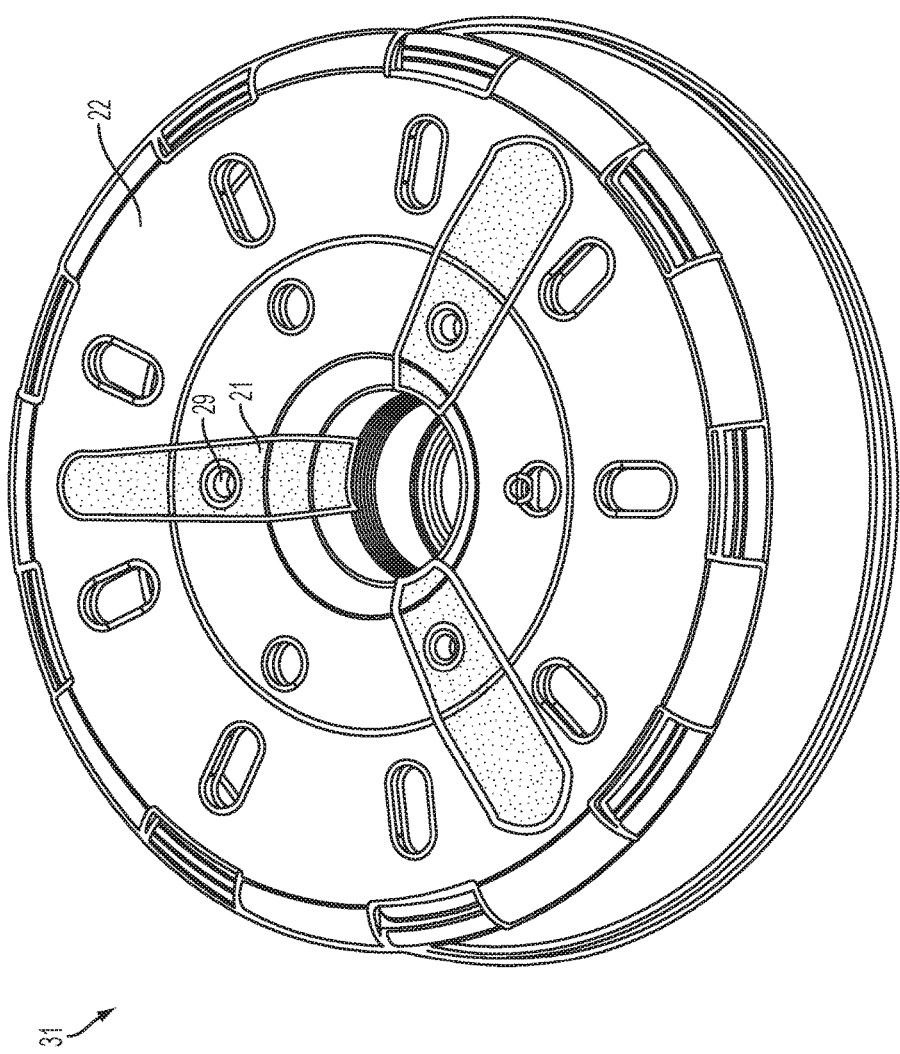
FIG. 5 is a perspective view of a molded bell of the present invention.
Figure 6A:
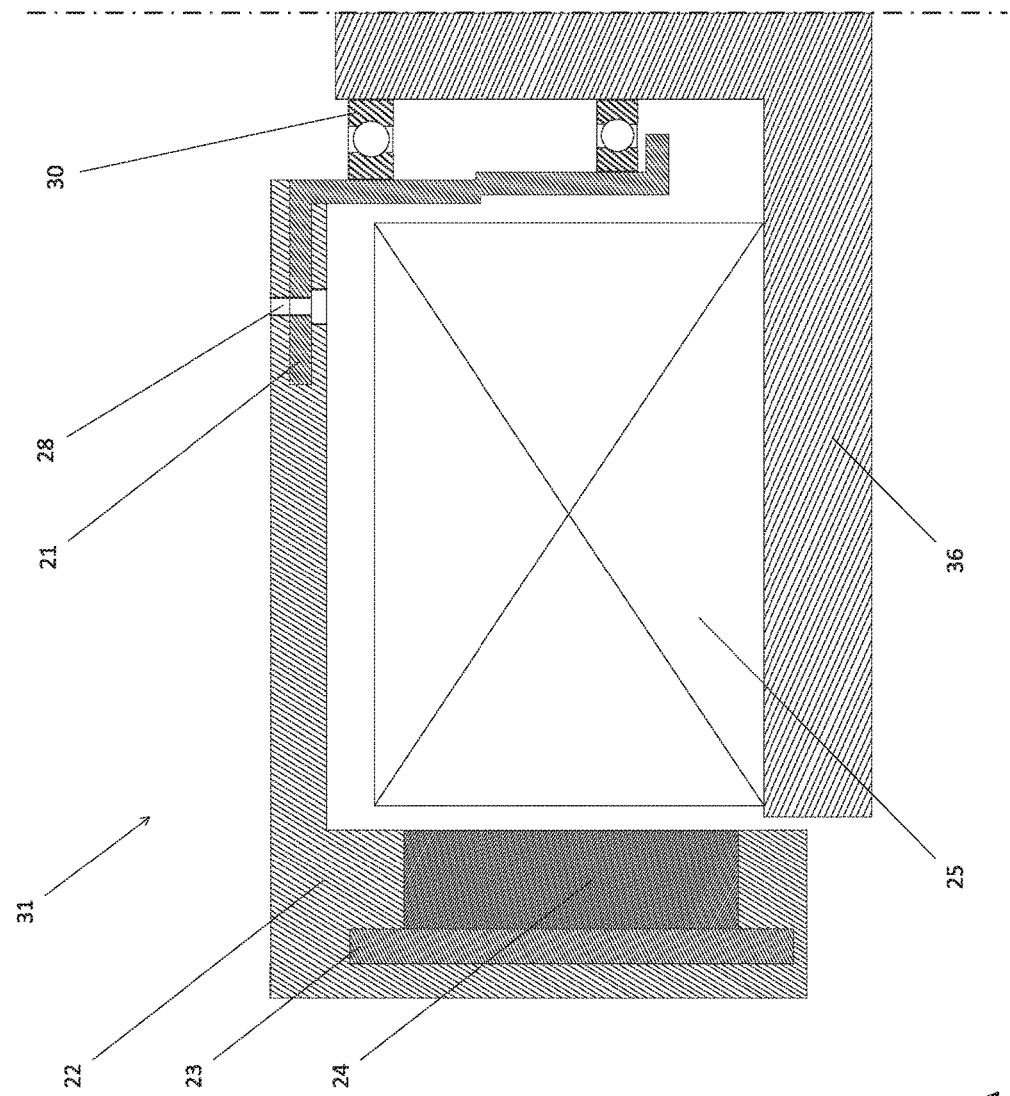
FIG. 6A is a sectional view of a portion of the molded bell 31 of the present invention, shown mounted at a stator 36 of the cooling fan motor, and shown with a threaded portion through the bell and metal insert for attachment to a fan, and shown with a hole through the bell and metal insert for attachment to a fan.
Figure 6B:
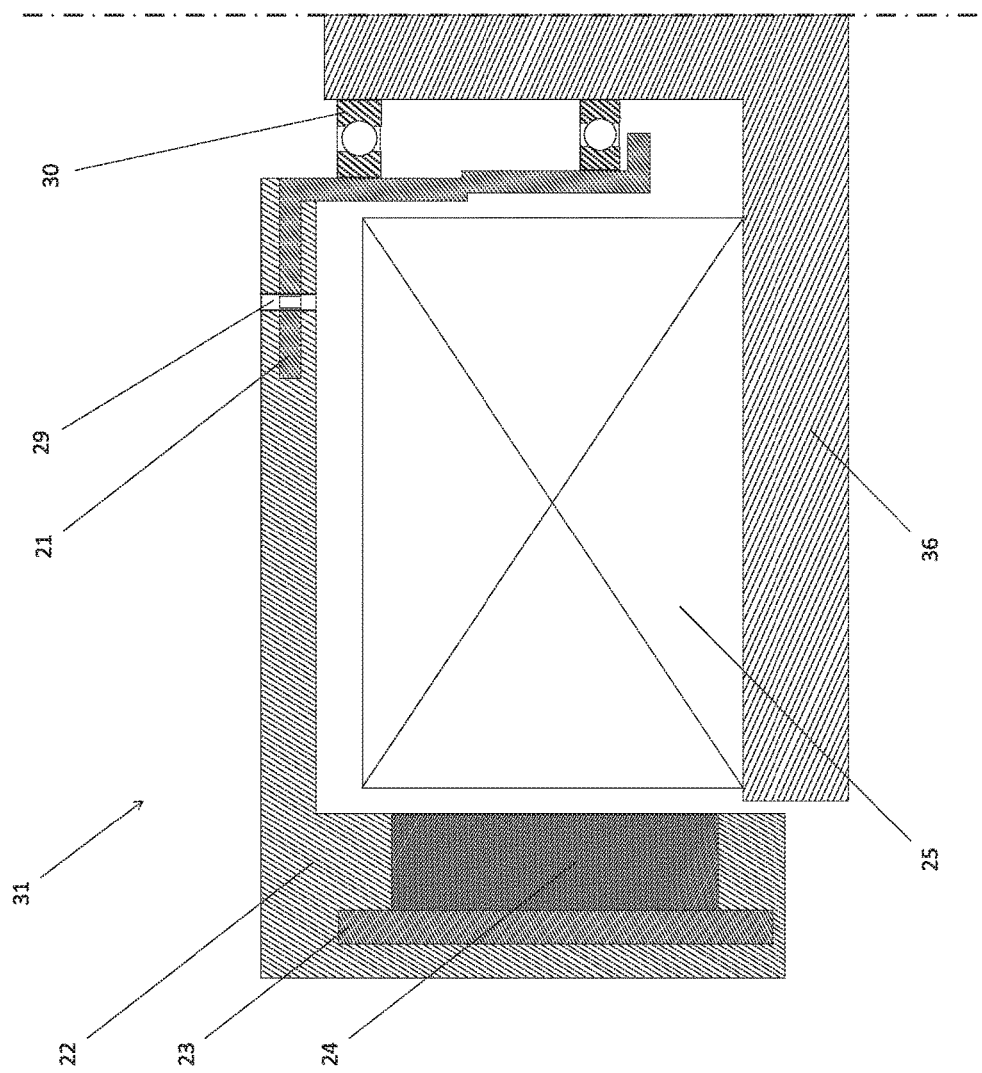
FIG. 6B is a sectional view of a portion of another molded bell 31 of the present invention, shown mounted at a stator 36 of the cooling fan motor, and shown with a threaded portion through the bell and metal insert for attachment to a fan.
Figure 6C:
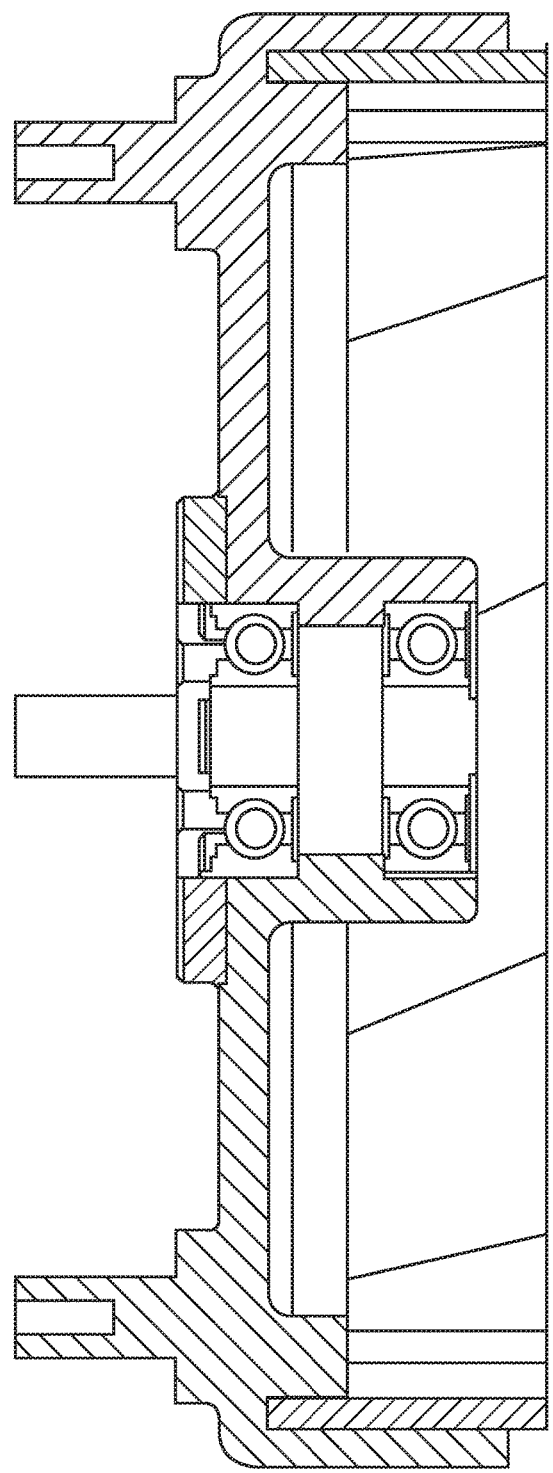
FIG. 6C is a sectional view of another molded bell of the present invention.
Figure 7:
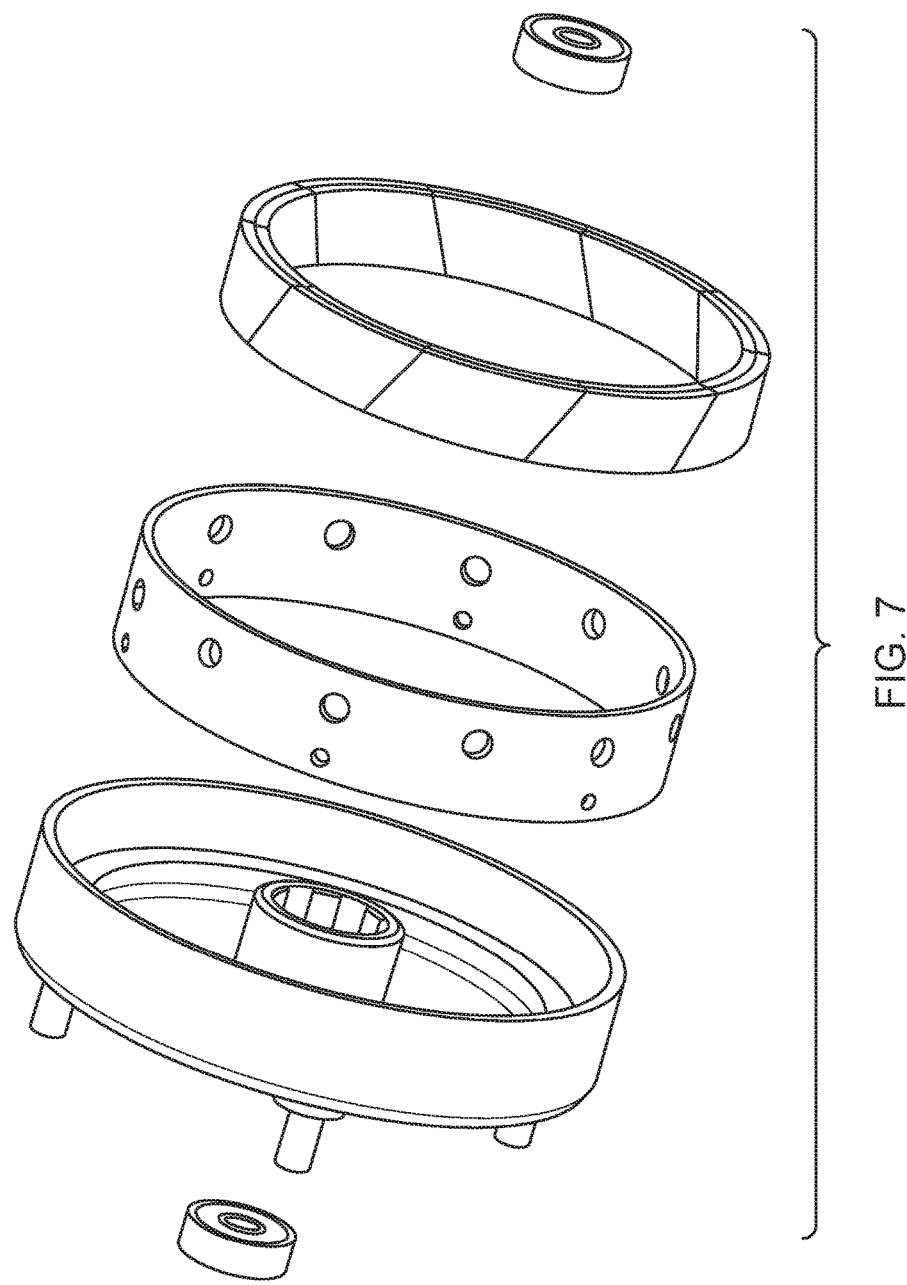
FIG. 7 is an exploded view of the molded bell and inserts of the present invention.
Figure 8:
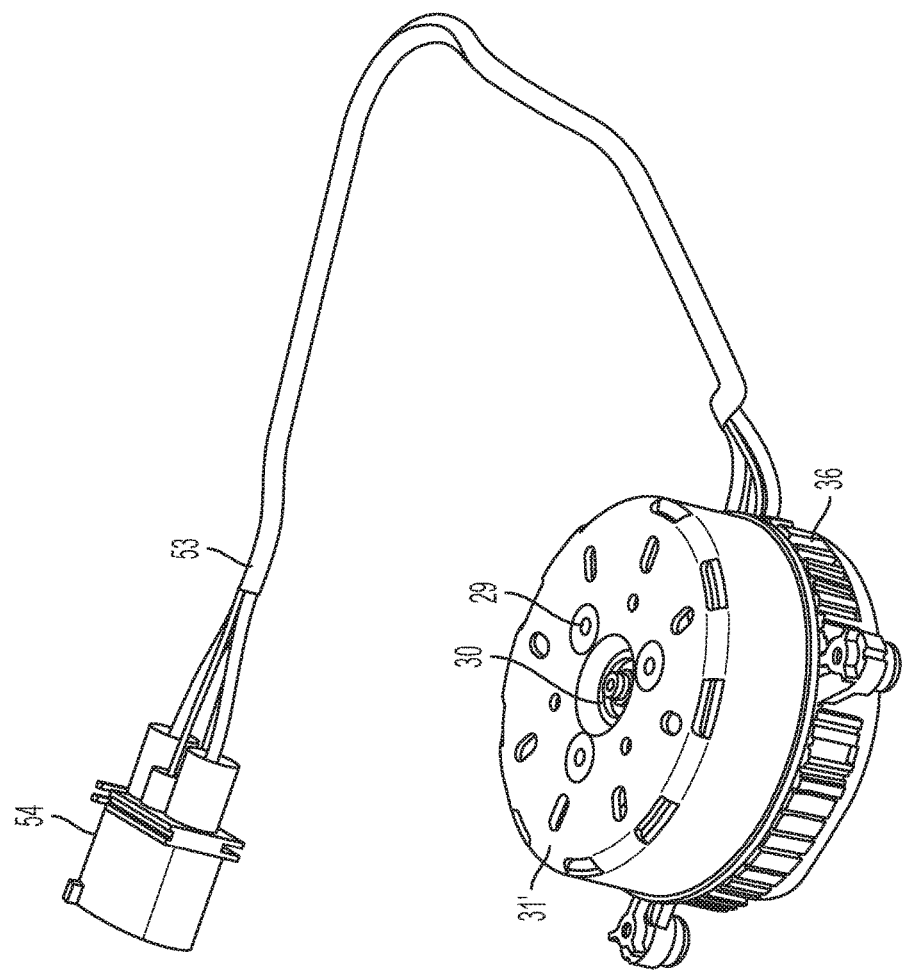
FIG. 8 is a perspective view of a motor for a cooling fan assembly.
Figure 9A:
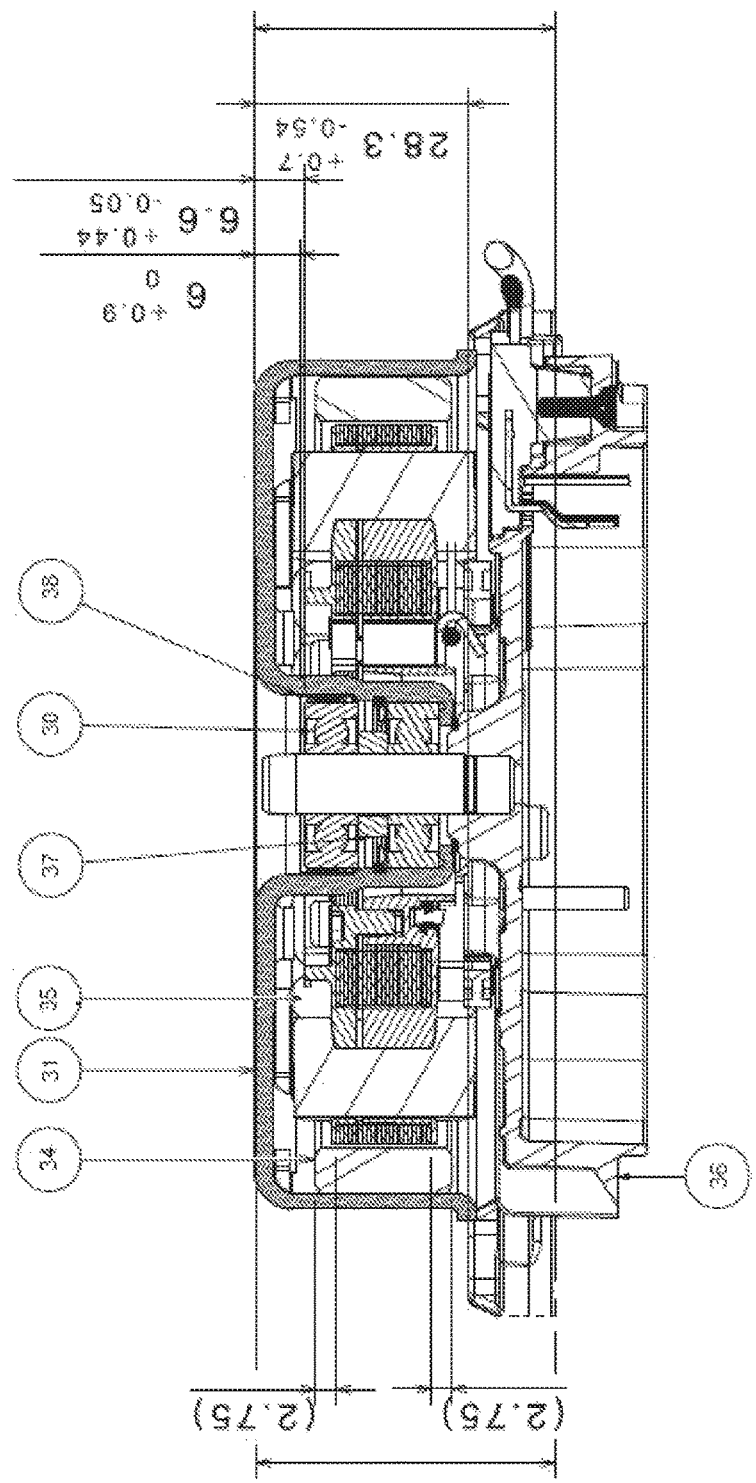
FIG. 9A is a sectional view of the motor of FIG. 8.
Figure 9B:
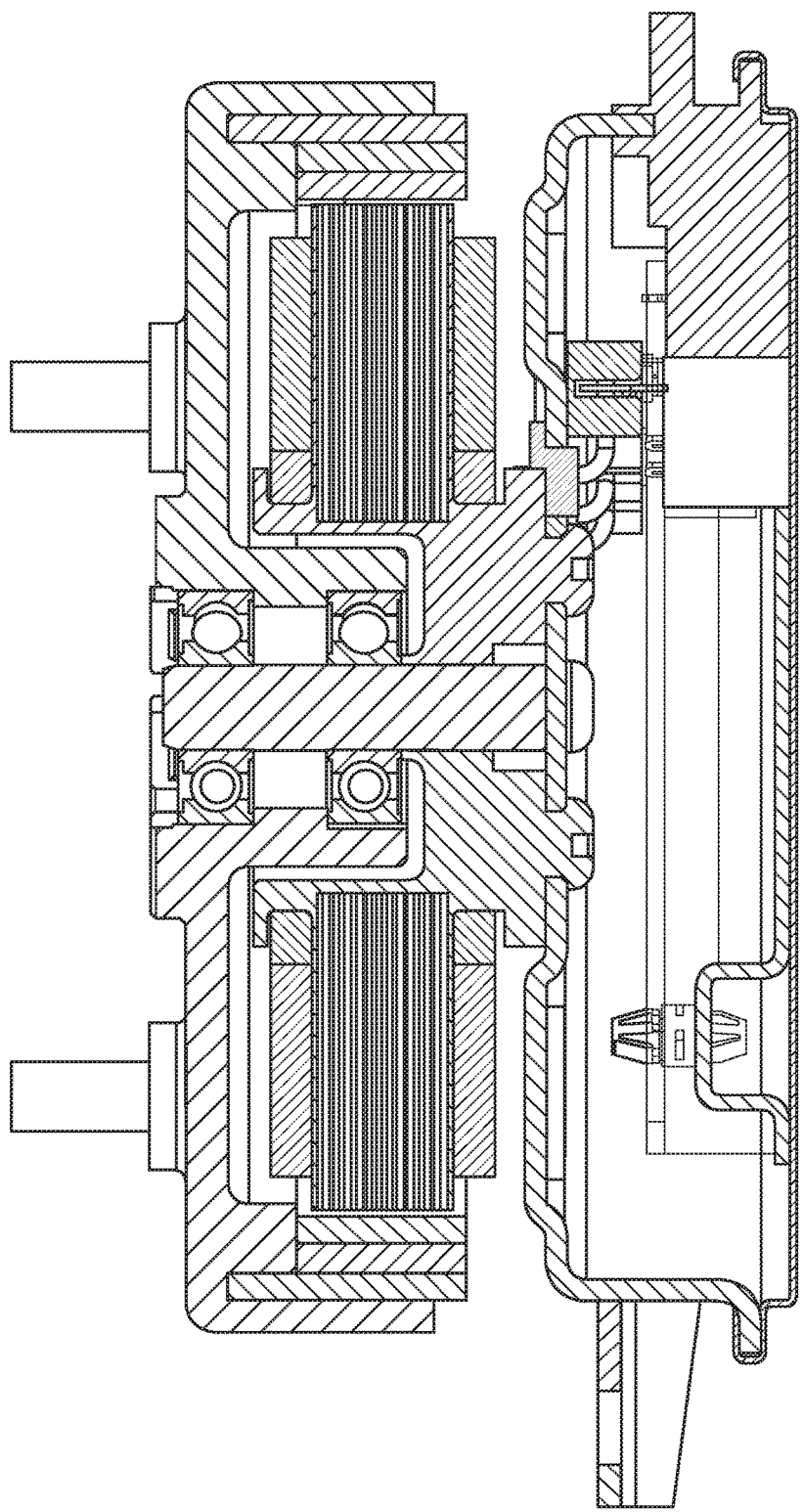
FIG. 9B is another sectional view of the assembly.
Figure 9C:
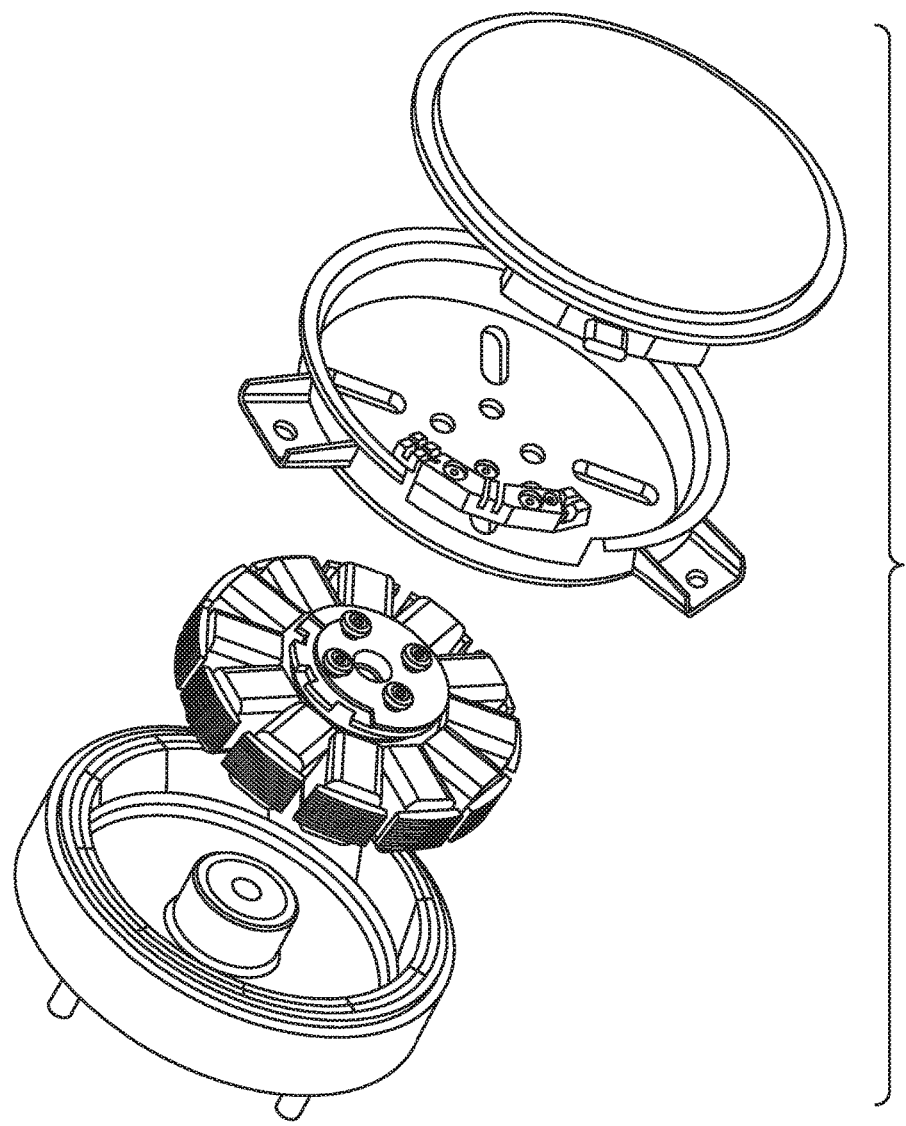
FIG. 9C is an exploded view of the assembly of FIG. 9B.
Figure 10A:
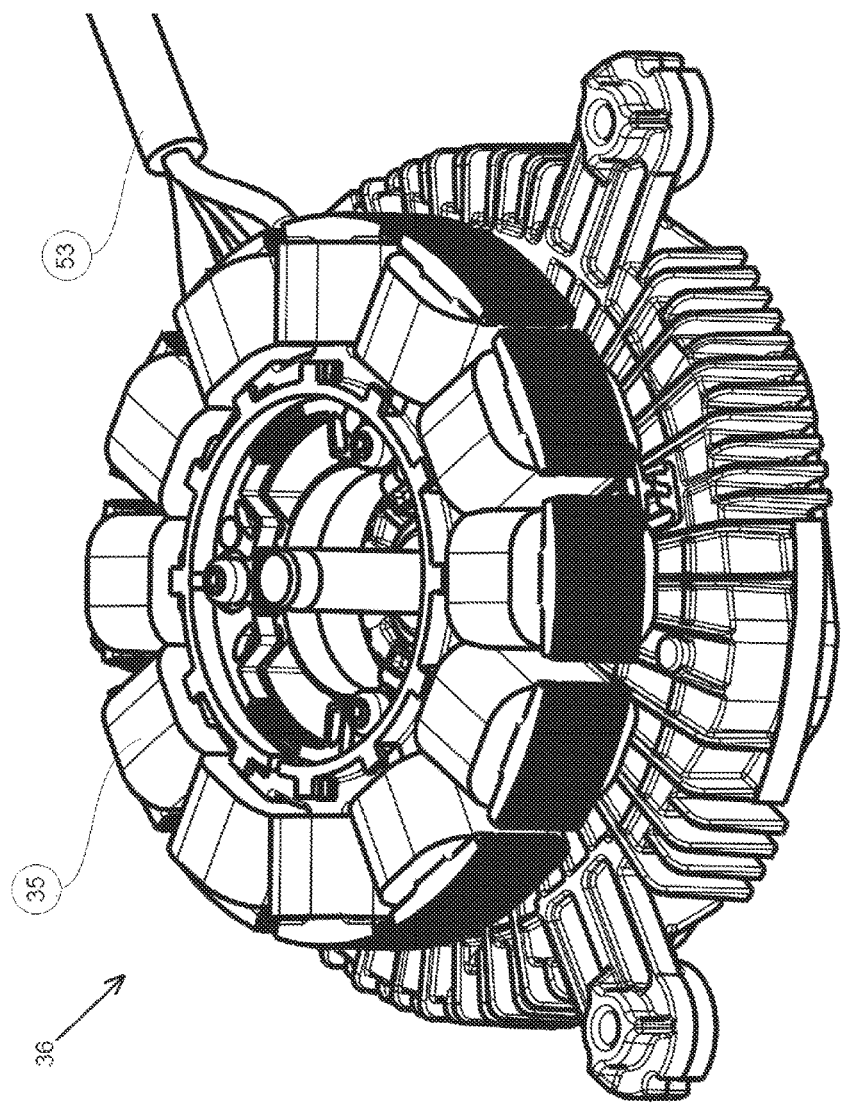
FIG. 10A is a perspective view of the motor of FIG. 8, shown with the metallic bell removed.
Figure 10B:
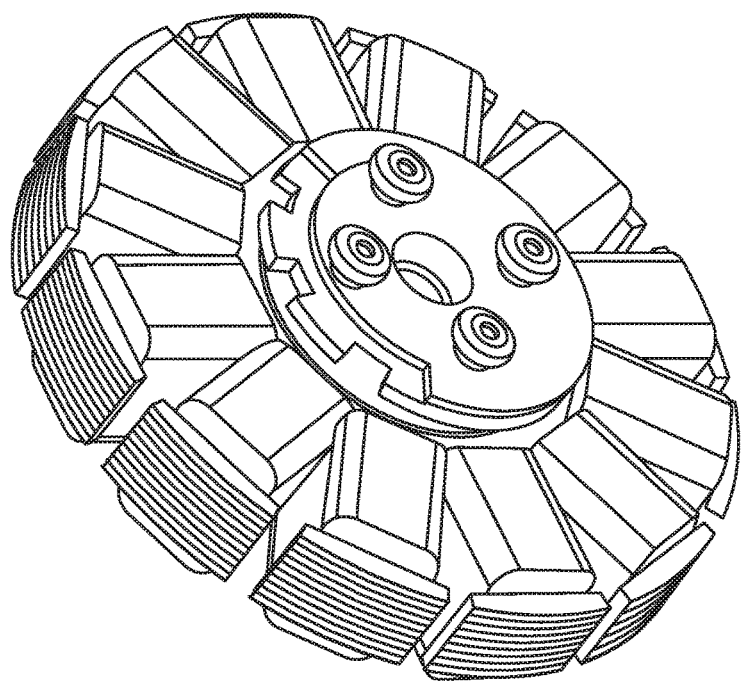
FIG. 10B is a perspective view of the stator of FIG. 10A.
Figure 10C:
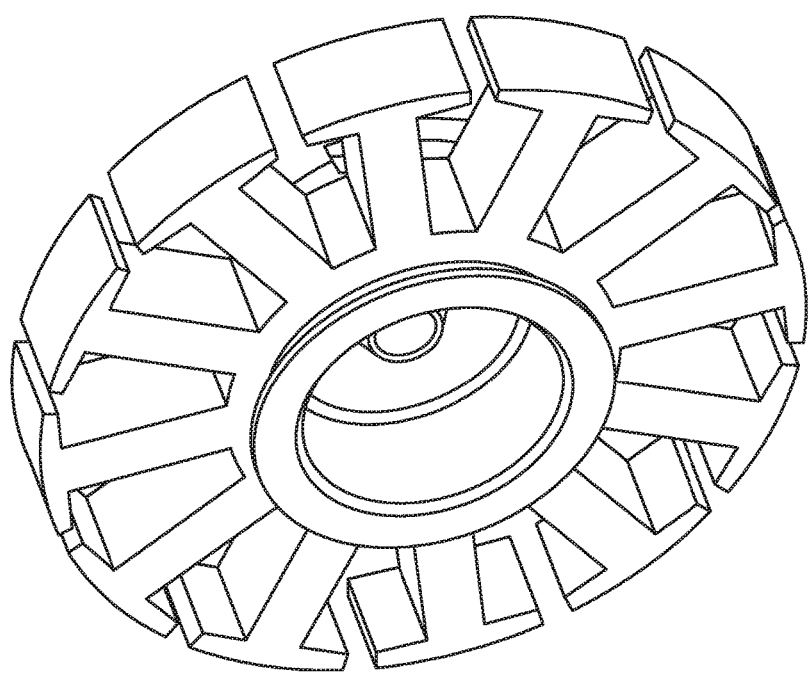
FIG. 10C is a perspective view of a stator of the present invention.
Figure 11:
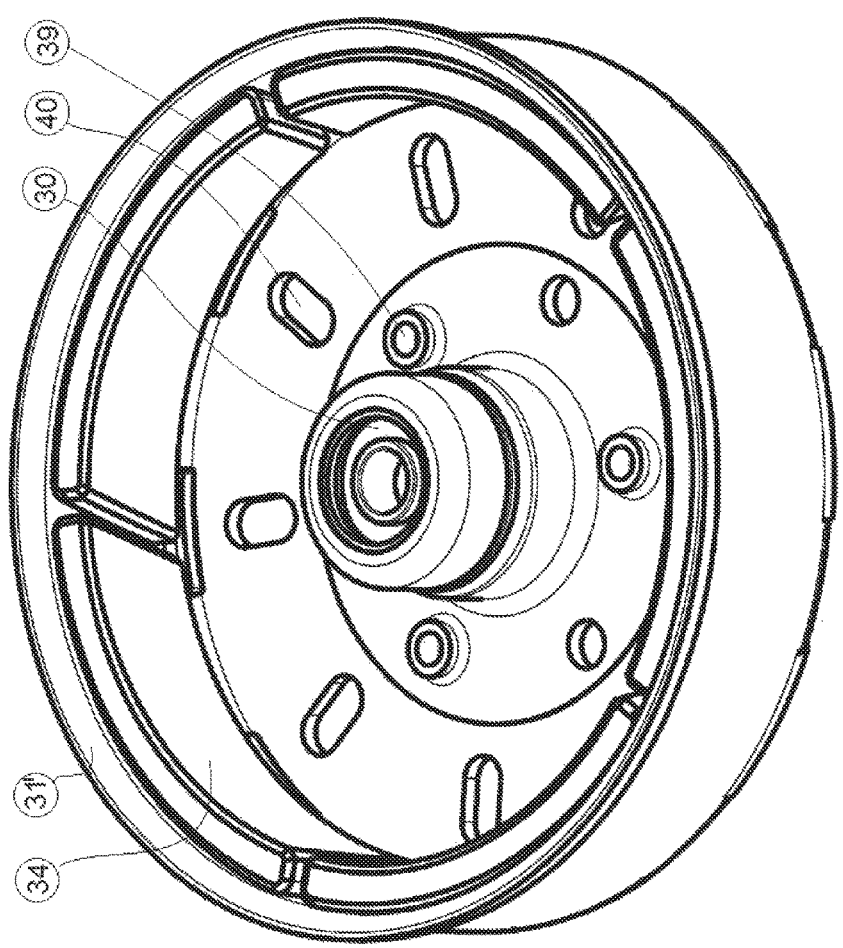
FIGS. 11 and 12 are perspective views of the bell of the motor of FIGS. 8 and 9.
Figure 12:
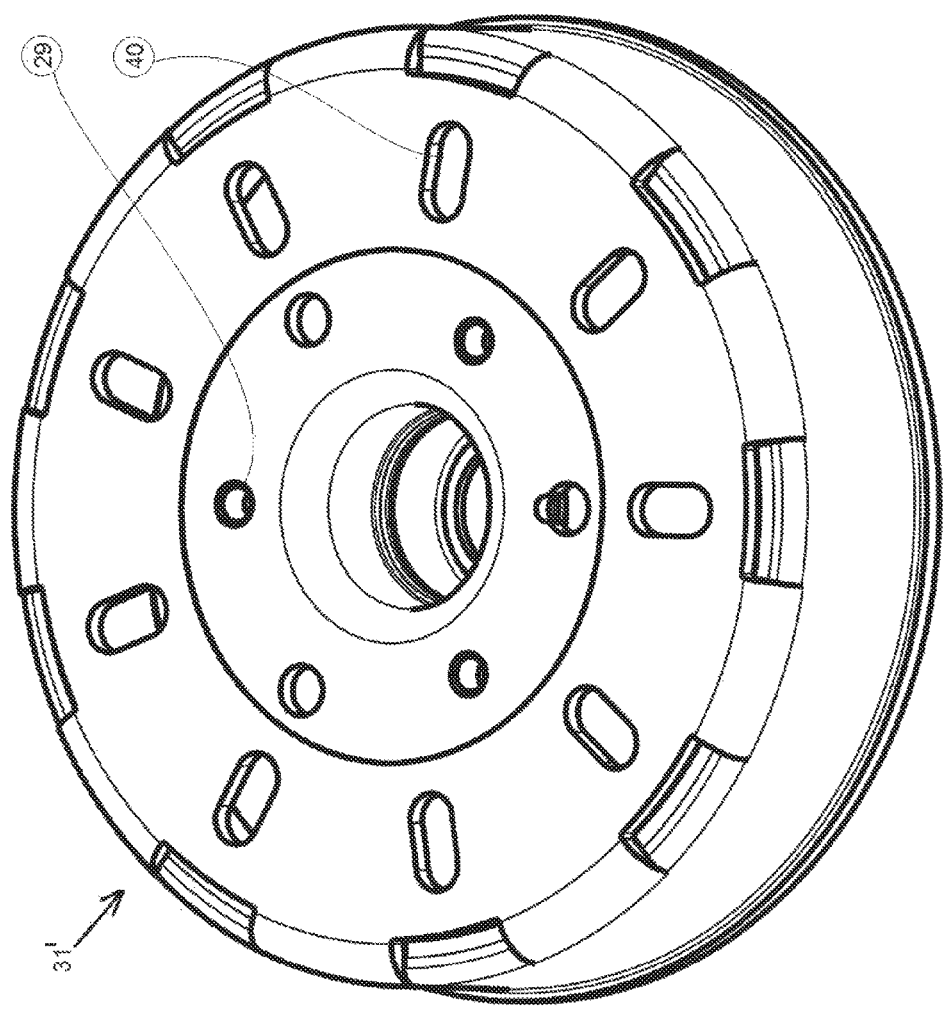
Figure 13:
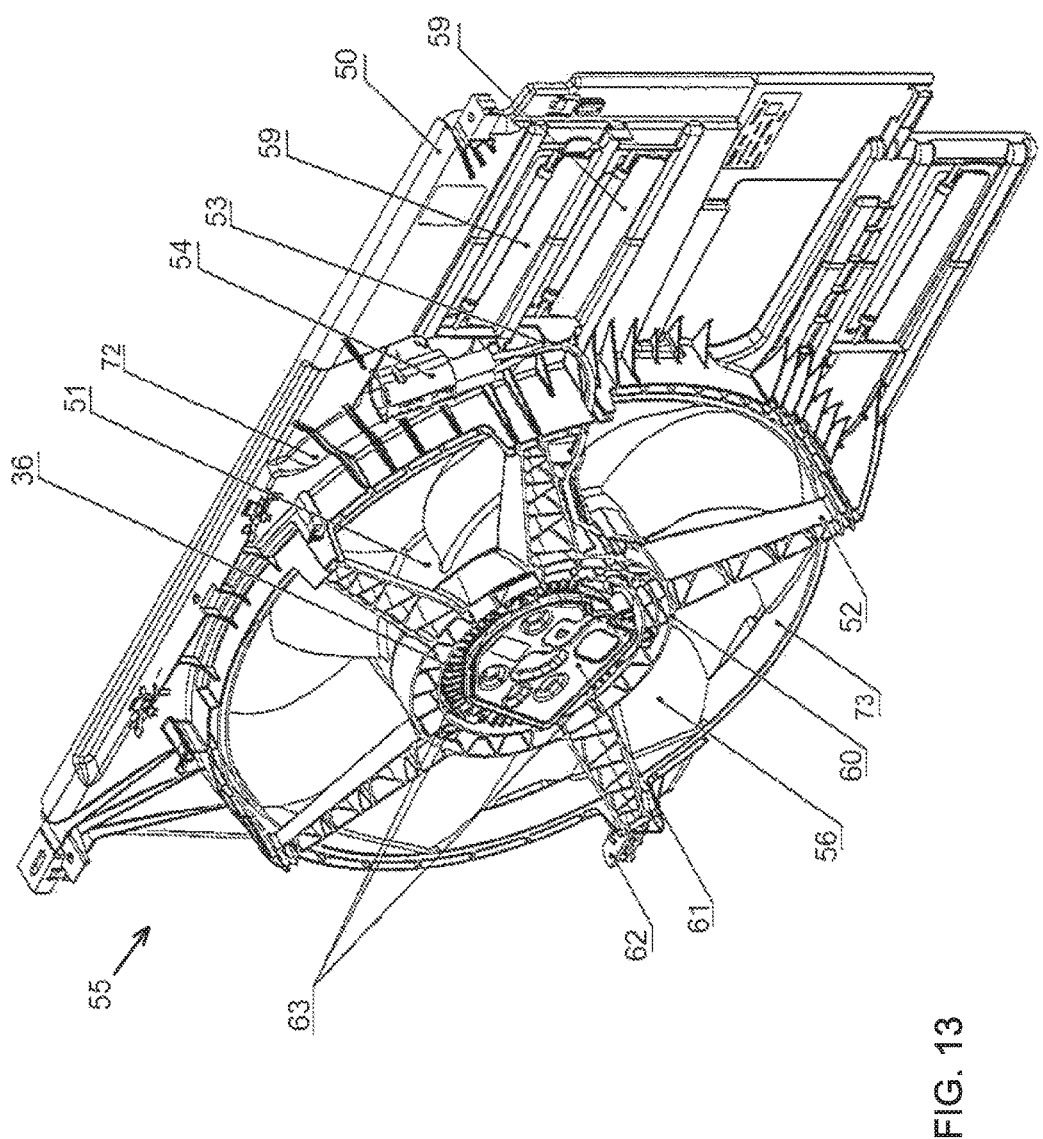
FIG. 13 is a perspective view of a known cooling fan module 55 with a single fan system, shroud 50 and secondary air intake via air flaps 59, and showing the mechanical items including barrel 72, outer fan ring 73, fan blades 56, hub 51, bearings 30, rotor bell 31, rotor axis 32 and mounting ring 60.
Figure 14:
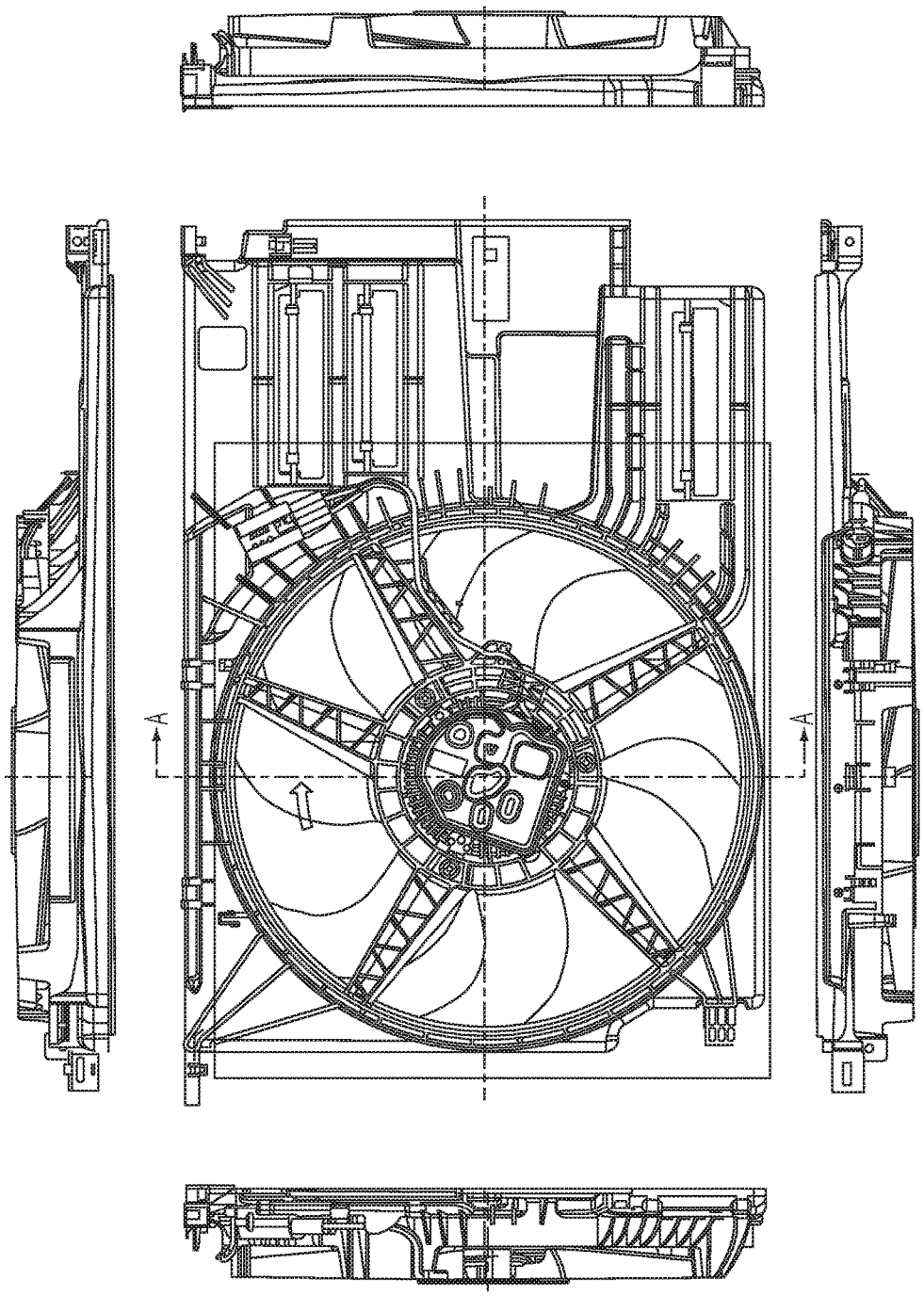
FIG. 14 shows views of the cooling fan module of FIG. 13.
Figure 15:
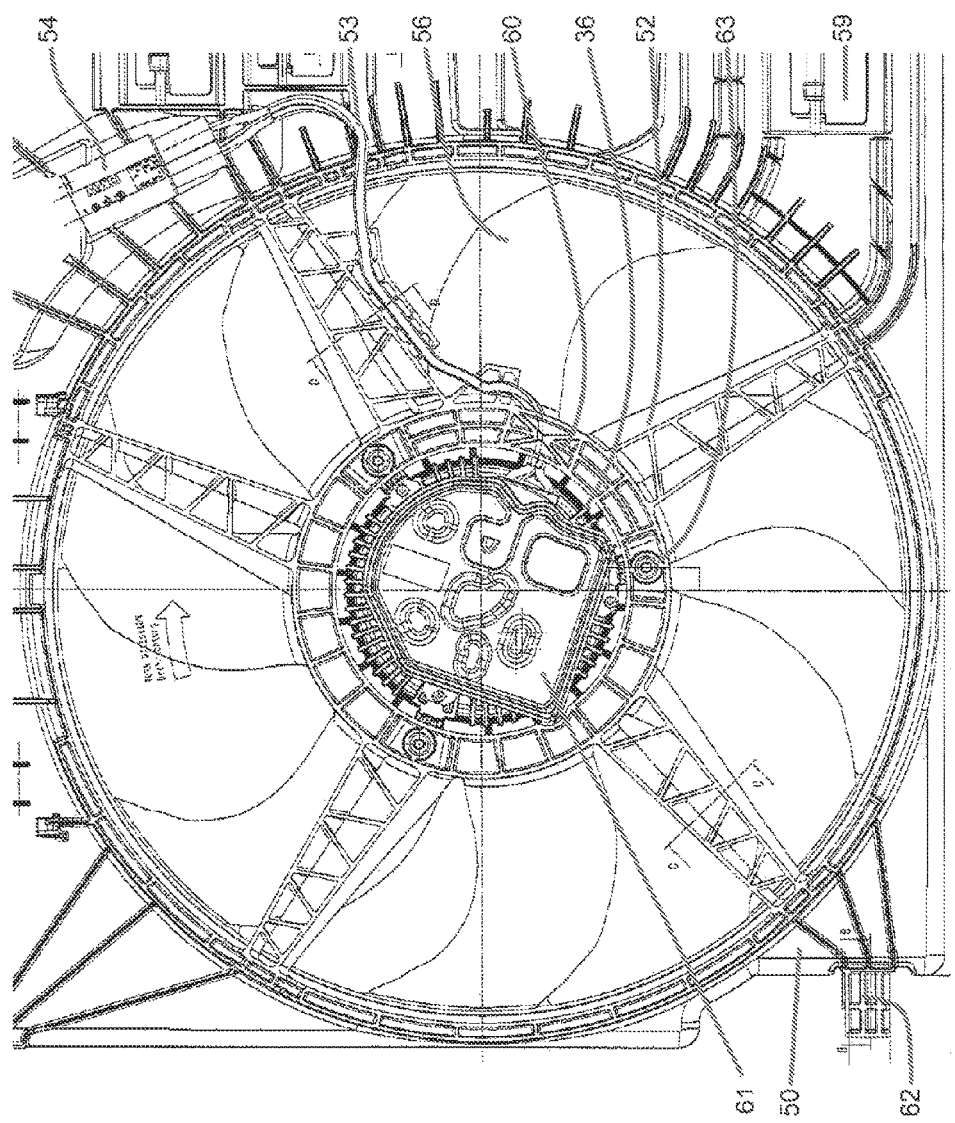
FIG. 15 is an enlarged view of the plan view of FIG. 14, showing the cooling fan system from the back side.
Figure 16:
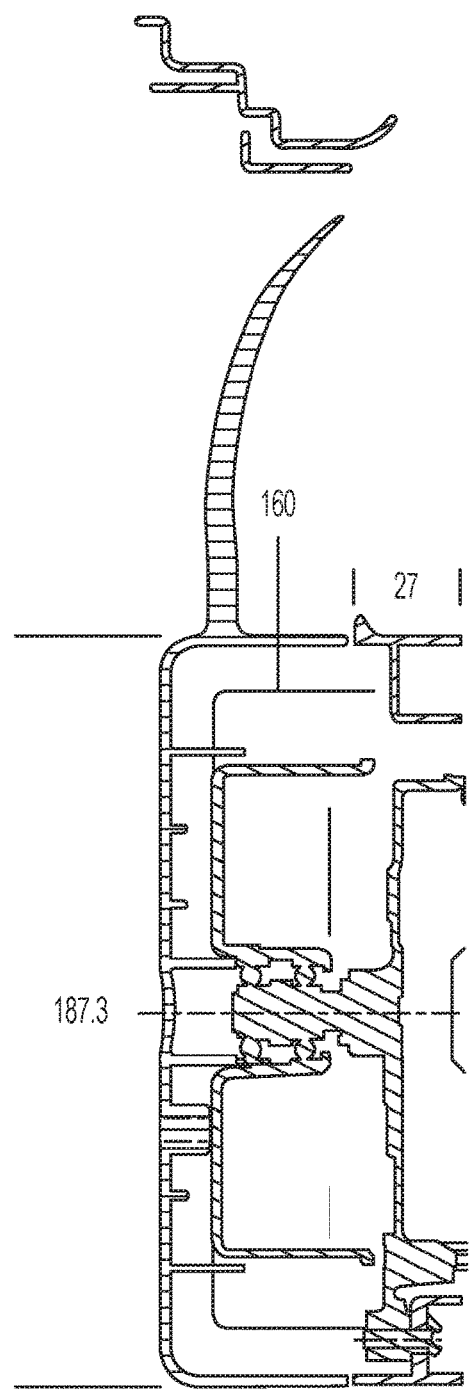
FIG. 16 is an enlarged sectional view along the line A-A in FIG. 14, showing the mechanical items including the barrel, outer fan ring, fan blades, hub, bearings, rotor bell, rotor axis and mounting ring of the cooling fan system in a side wise cross section.

Known art rotors are typically fully made out of steel. The present invention provides a substantially non-metal or plastic bell 31, such as shown in FIGS. 5-6C. The bell of a 500 W Motor may weigh about ¼ of the whole motor weight, which may equate to about 1 kg of a 4 kg motor. For economic reasons, it is desirable to reduce the weight and steel costs of the rotor substantially while achieving comparable torque output performance. Another goal may be to reduce the noise that may occur by vibration of the bell 31 which may be in an undesired (resonance-) frequency. By reducing the mass and changing the e-module of its material, the resonance frequency may be shifted beneficially and the amplitude may be less high.

By that it is an aspect of the present invention to mostly replace the metal (typically steel) of the bell with a polymeric or non-metallic bell, which may be produced by deep drawing mostly by a plastic compound. The plastic compound may be formed into the bell by injection molding. Optionally, the plastic compound may have permeable properties achieved by mixing permeable particles into it such as PPS+EMA GF30 overmolded (Polyphenylensulfid+Ethylen-Methacrylsäure) high performance reactive blend. Optionally, the plastic may comprise any suitable engineering plastic, such as, for example, Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), Ultra-high-molecular-weight polyethylene (UHMWPE/UHMW) and/or the like.

Optionally, and as a preferred embodiment, permanent magnets 24 and optionally steel parts 23 for guiding the magnetic flux may be inlayed to the mold and insert molded into the molded or formed bell 31. The plastic or polymeric or non-metal bell 31 may have a similar outer shape as the known steel part or may be optimized to the insertion molding. The bell may bear steel inlays 21 for improving the stability and/or for taking the fixation 57 of the cooling fan 55 at the hub 51 (such as can be seen with reference to FIG. 4). The fixation 57 may be comprised by screws, rivets, hot stamping bolts or the like. As an alternative, the blower wheel may be glued, welded or crimped to the rotor. In that case the screwing holes may be obsolete and thus omitted. There may be form fitting structures used in combination.

Thus, the present invention provides a molded polymeric rotor that is molded, such as via injection molding, of a thermoplastic resin material, such as an engineering plastic or the like. For example, the metallic magnetic elements or magnets are placed into an injection mold cavity or structure as part of an insert molding operation, and then the thermoplastic material is injected into the mold to mold/form the rotor or part and to overmold the magnets with the thermoplastic material of the rotor. When the molded part is formed and cured, the magnetic elements are insert molded or established at the molded polymeric rotor or bell.

As an advanced occurrence of the invention the (plastic-) fan part 55 (FIG. 4) and the (mostly plastic-) rotor bell 31 may be molded as one piece. This part (31+55) may be attached to the stator 36 of the motor as a single unit. The fan part or fan element includes a plurality of fan blades, such as at least two fan blades and preferably at least four fan blades or at least six fan blades.

As an alternative for both, the permanent magnets 24 may be not inlayed to the mold but fixed conventionally (such as by gluing or the like) at the inside of the bell. As another alternative, the molded piece may have pockets within the rotor outer rim area in which the permanent magnets 24 and/or the steel parts can be inserted after producing the molded piece. The pockets may have a shape to affiliate different variants of magnets eventually in combination with the steel parts 21 for producing different motor variants.

Thus, the present invention provides a plastic or mostly plastic or polymeric rotor bell. The polymeric rotor bell may be injection molded and may have one or more metallic or magnetic elements insert molded therein during the injection molding process that forms the rotor bell. Optionally, the rotor bell may be attached to or molded with or unitarily formed with the cooling fan to provide a fan and rotor unit that may be readily attached at a stator of the motor. The non-metallic rotor is suitable for use as part of a motor of a cooling fan of a vehicle. However, aspects of the present invention may be suitable for use in other motors and other fans.

Optionally, and such as can be seen with reference to FIGS. 9B, 9C, 10B and 10C, the stator of the motor may be made out of or formed by injection molding of an engineering plastic or thermoplastic resin, having mechanical and thermal properties suitable for use in the subject application. Suitable injection moldable thermoplastic plastic resins include, for example, Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), Ultra-high-molecular-weight polyethylene (UHMWPE/UHMW) and/or the like. A preferably engineering plastic material may comprise a non-metallic injection molded material, such as, for example, a PPS+EMA GF30 overmolded (Polyphenylensulfid+Ethylen-Methacrylsäure) high performance reactive blend material or the like. The magnets may be formed out of and/or overmolded with a moldable plastic, such as, for example, Plastic-bound NdFeB or the like.

Figure 17:
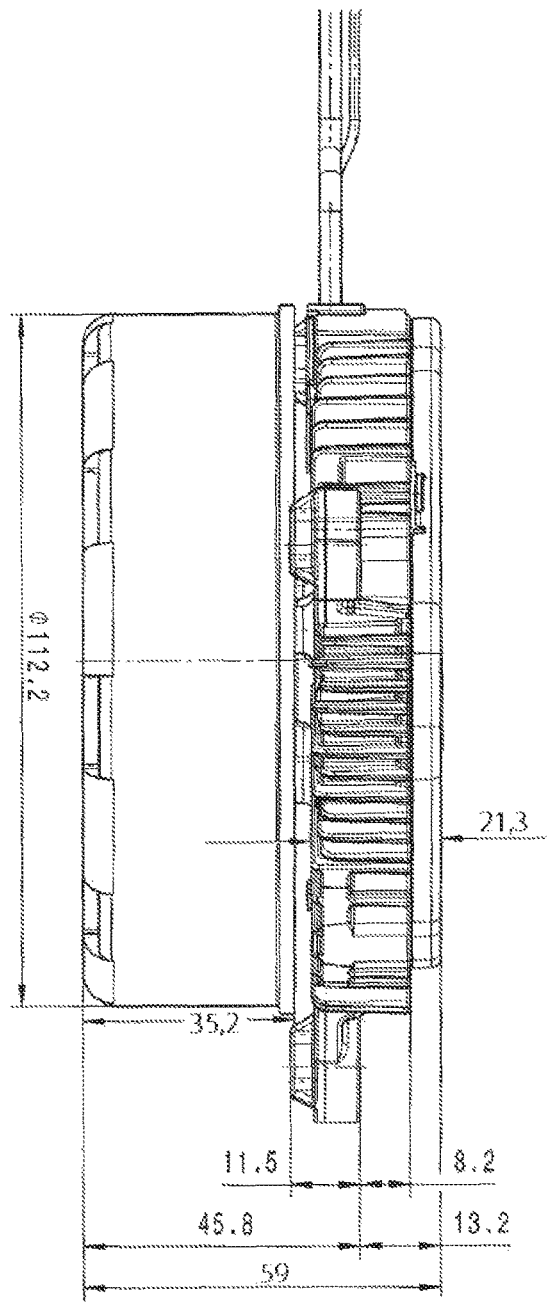
FIG. 17 shows a known brushless direct current (BLDC) 400 W cooling fan motor with an overall length of 59 mm, without the fan and fixation structure.
Figure 18:
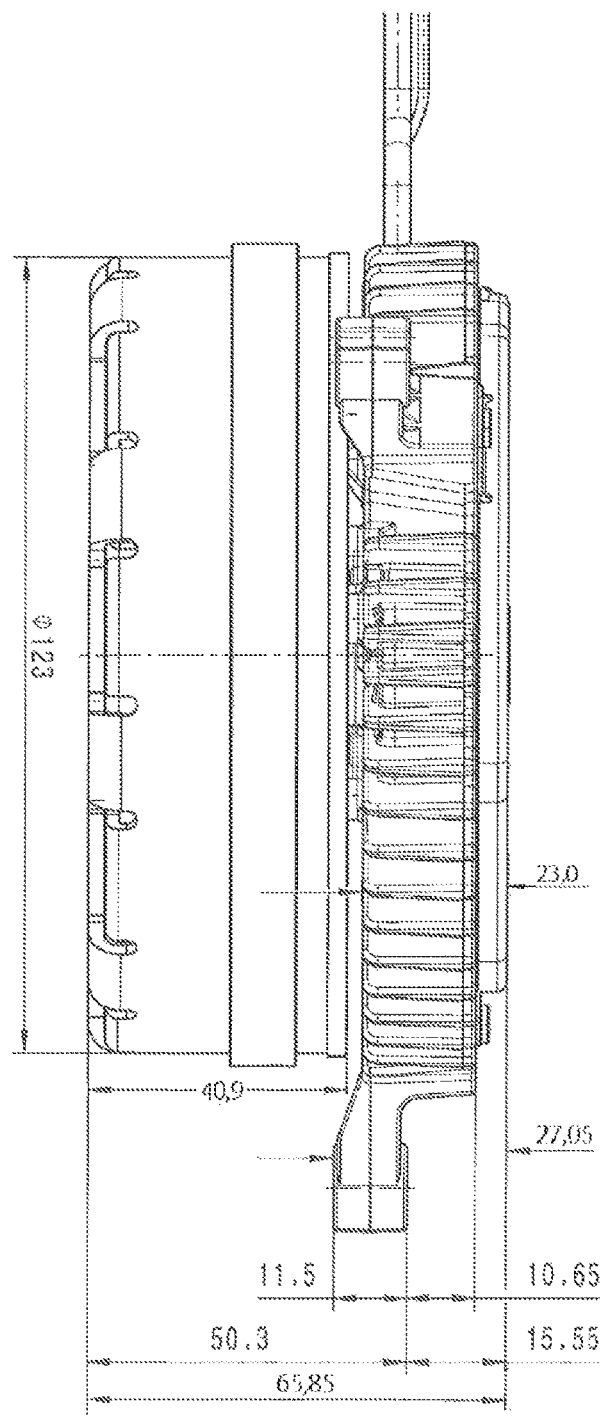
FIG. 18 shows a known BLDC 600 W cooling fan motor with an overall length of 65.85 mm, without the fan and fixation structure.
Figure 19:
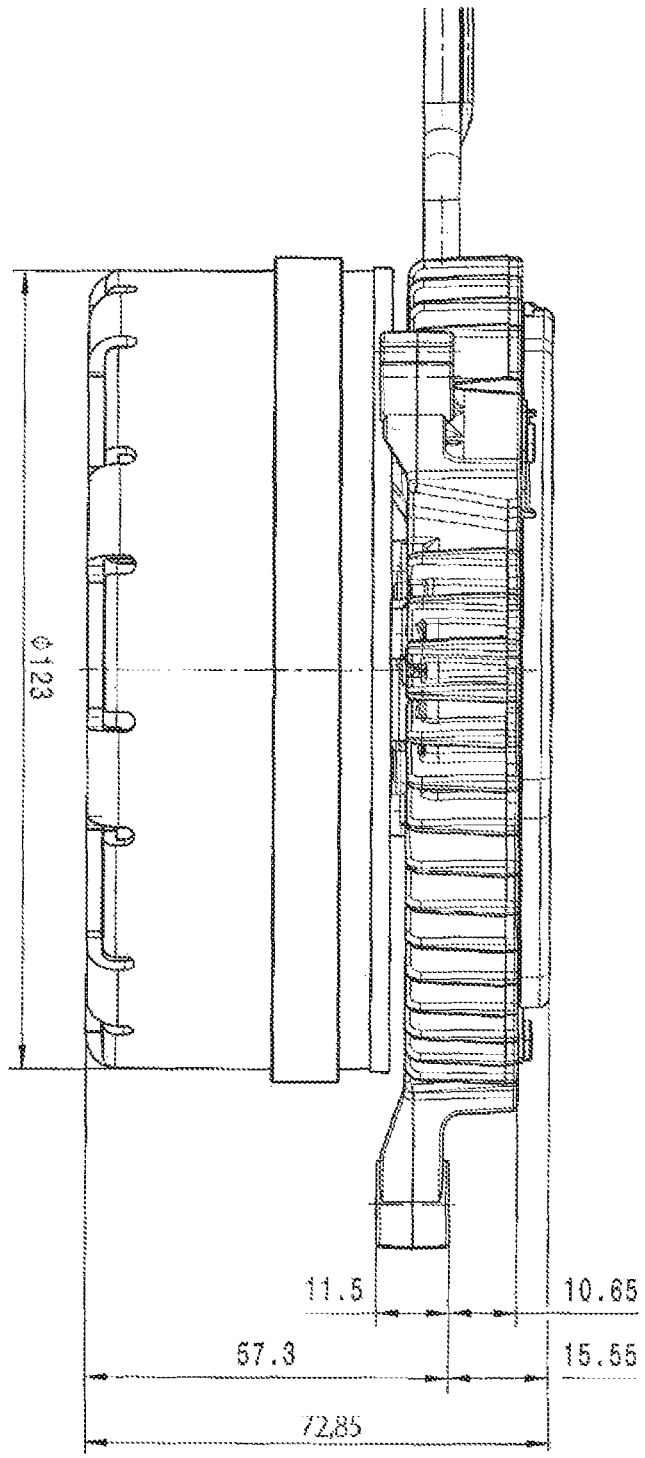
FIG. 19 shows a known BLDC 850 W cooling fan motor with an overall length of 72.85 mm, without the fan and fixation structure.

Optionally, and in accordance with the present invention, the cooling fan, motor and shroud assembly may be optimized in terms of the required lengths (x-dimension). The overall length is often a restrain which occurs that instead of using one powerful cooling fan motor (such as a 850 W motor shown on FIG. 19 with a length of about 73 mm), two less powerful (such as two 400 W motors shown in FIG. 17 with 59 mm lengths, which is 14 mm less than the 850 W motor from FIG. 19 and about 7 mm shorter than the 600 W motor shown in FIG. 18 that has a length of about 66 mm) shorter, but in sum more expansive cooling fan motors may have to be used. Because of this and other aspects, measures to reduce the overall lengths, especially on powerful cooling fan assemblies, are desired. For achieving that, not just the motor bell may be optimized, but also the stator and electronics build up, the strut design and material, the cable ducting and the cooling fan design and build up.

FIGS. 2, 3, 13-16 show known cooling fan systems. In a vehicle, a coolant radiator would be mounted in front to the shroud. The fan motor's stator 36 is fixed at the mounting ring 60. That structure is extended via the struts 52 reaching to the barrel 72. The motor comes with a cable which is guided along the struts ending on a wire harness connector 54 on the shroud's back side.

In accordance with the present invention, the design of the cooling fan may have reduced heights of the stator and its mounting structure 60. The present invention may replace the stator struts 52 material, which is typically a fiber plastic composite, with struts comprising metal (such as like aluminum or steel) or a compound having metal inlays, which than can be made thinner.

Another alternative optional measure to reduce the heights may be to eliminate the mounting structure, especially the space consuming motor mounting ring 60 by extending the struts structure out of the stator's body structure over the full blower radius. An example of such a solution is shown in FIGS. 20-22 and 27-31. These type of struts may be called stator arms 66 in the following for better distinguishing. The fixation to the shroud 50 or barrel 72 will be at the very ends, done by press fit or form fit and/or screwing (71), clipping, gluing or welding or the like. Because the stator arms will by one piece with the stator body, the used material will be preferably identical, such as, for example, aluminum or the like. FIGS. 27-31 show examples of different mounting positions and numbers of stator arms from three to six arms.

Because usually the cable outlet from the motor is sidewise disrupting the motor mounting ring structure, the structure has to be relatively thick. When the mounting ring 60 is eliminated, the motor cable outlet is aligned with one stator arm and the cable 53 may be embedded within the stator arms 66, whereby the overall height may not be restrained by the cabling anymore. As an optional aspect of the present invention, and as shown in the examples of FIGS. 27-31 and 33, the cable may split before entering the motor electronics compartment. This may reduce the risk of electrically shorting due to water intrusion due to leakages on the cable sealing. The sealing itself may comprise any suitable sealing material and elements to limit water intrusion.

Figure 32:
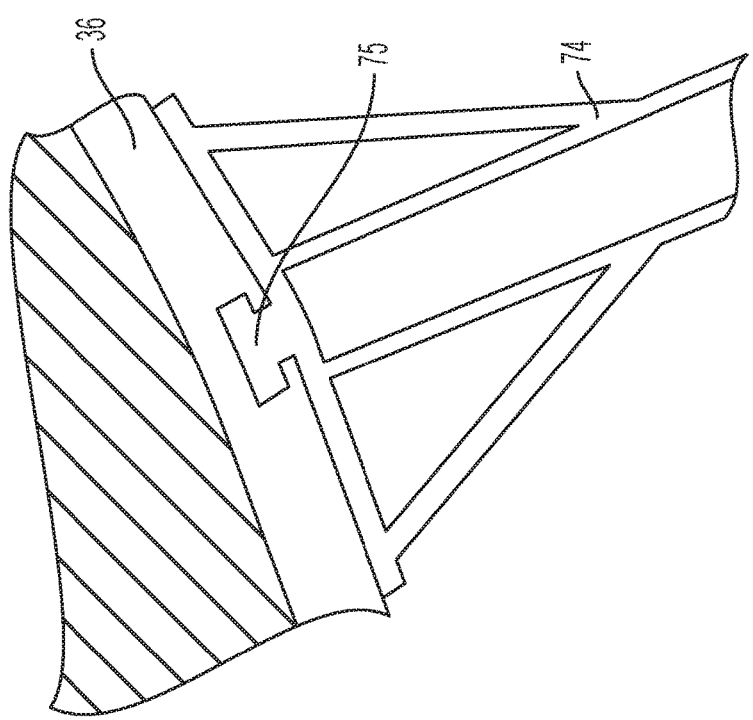
FIG. 32 shows an attachable stator arm with T shape slot form fit connection to the stator body in accordance with the present invention.

As another option of the present invention, not all or just the cable guiding stator arms may comprise one piece and may be manufactured or formed with the stator body but the further or additional arms may be attachable by a form fit or press fit or interference fit, such as a T (shape) slot (such as can be seen with reference to FIGS. 32 and 33), a Y slot or the like, optionally with a further securing fixation, such as a glue, a screw or other fastener, or a clip or the like. The mounting arms or additional arms thus may extend from the perimeter frame of the fan assembly to mount the motor at the fan assembly, with the fan element attached to or formed with the motor's rotor or bell that is rotatably driven relative to the stator and fan assembly frame when the motor is actuated.

Figure 21:
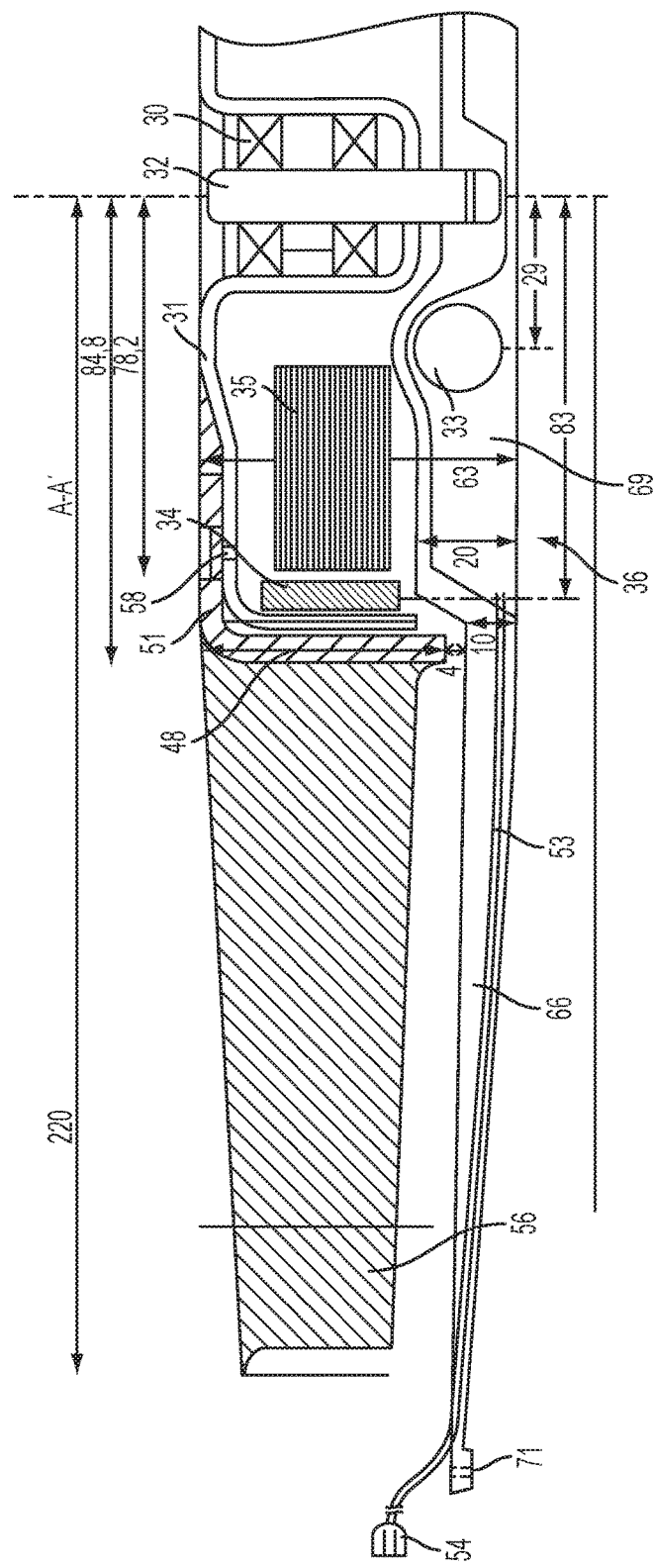
FIG. 21 is a sectional view similar to FIG. 20 of a cooling fan assembly in accordance with the present invention, with the capacitor(s) positioned flat, and with the whole motor-fan assembly having a height of about 63 mm, and with the motor bell having a size of about 83 mm, and with the solenoids being shifted about 10 mm outward.
Figure 22:
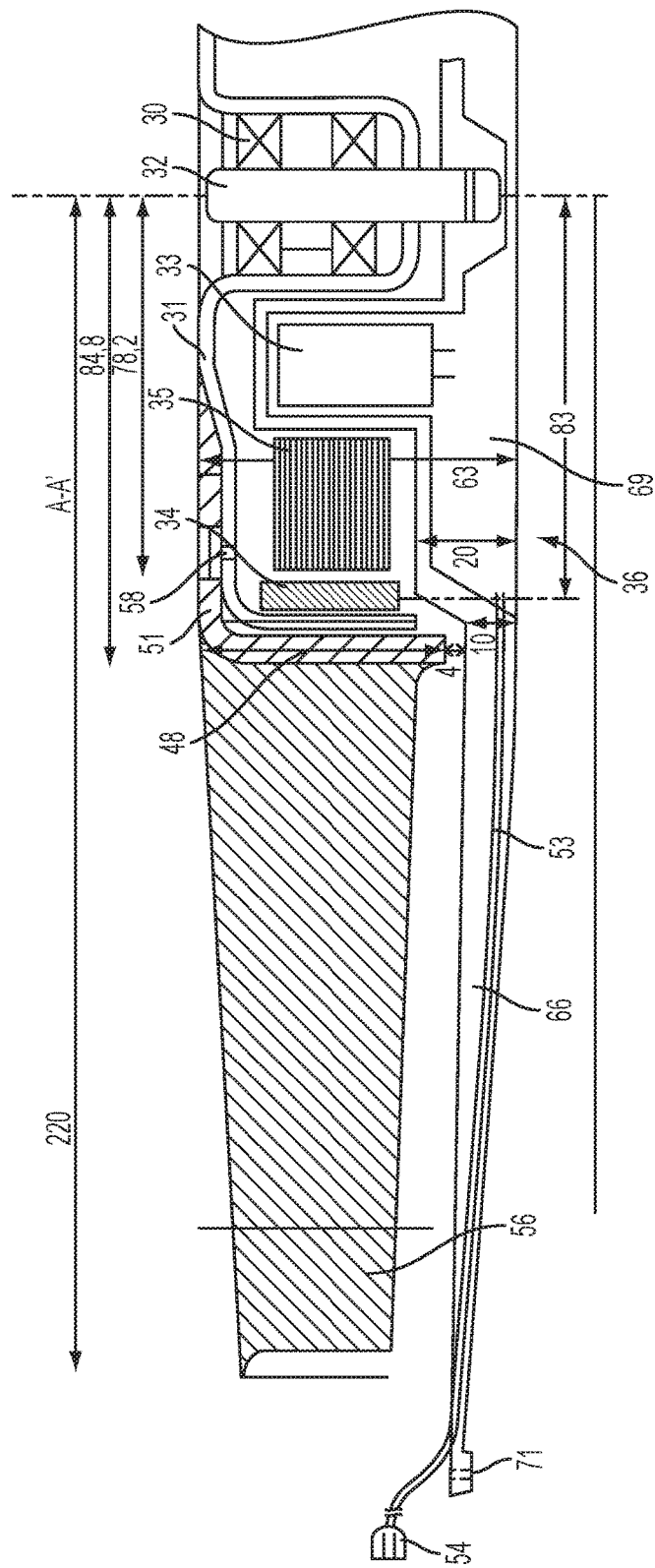
FIG. 22 is a sectional view similar to FIGS. 20 and 21 of a cooling fan assembly in accordance with the present invention, with the capacitor(s) positioned upright within the space that is opened by shifting the solenoids about 10 mm outward and making it one third shorter (in comparison to the fan shown in FIG. 20)

As another option to further reduce the cooling fan assembly's height, the height of the solenoids 35 may be reduced by mounting the solenoids at a wider radius. By that, the lever arm (I) to the propelled system gets longer, for achieving the same momentum (M) less force (f) is needed (M=f*I). For less force, smaller solenoids can be used. Examples of such a solution are shown in FIGS. 21 and 22. By that, the height may be reduced by about 15 percent (such as, for example, about 4 mm at 25 mm solenoids). When the radius of the solenoid assembly rises, the motor bell has to grow in diameter accordingly. For giving a bell of higher diameter space within the fan hub without shortening the fan blades area, there may be a measure to reduce the width of the rotor hub enforcement ribs 67.

Figure 20:
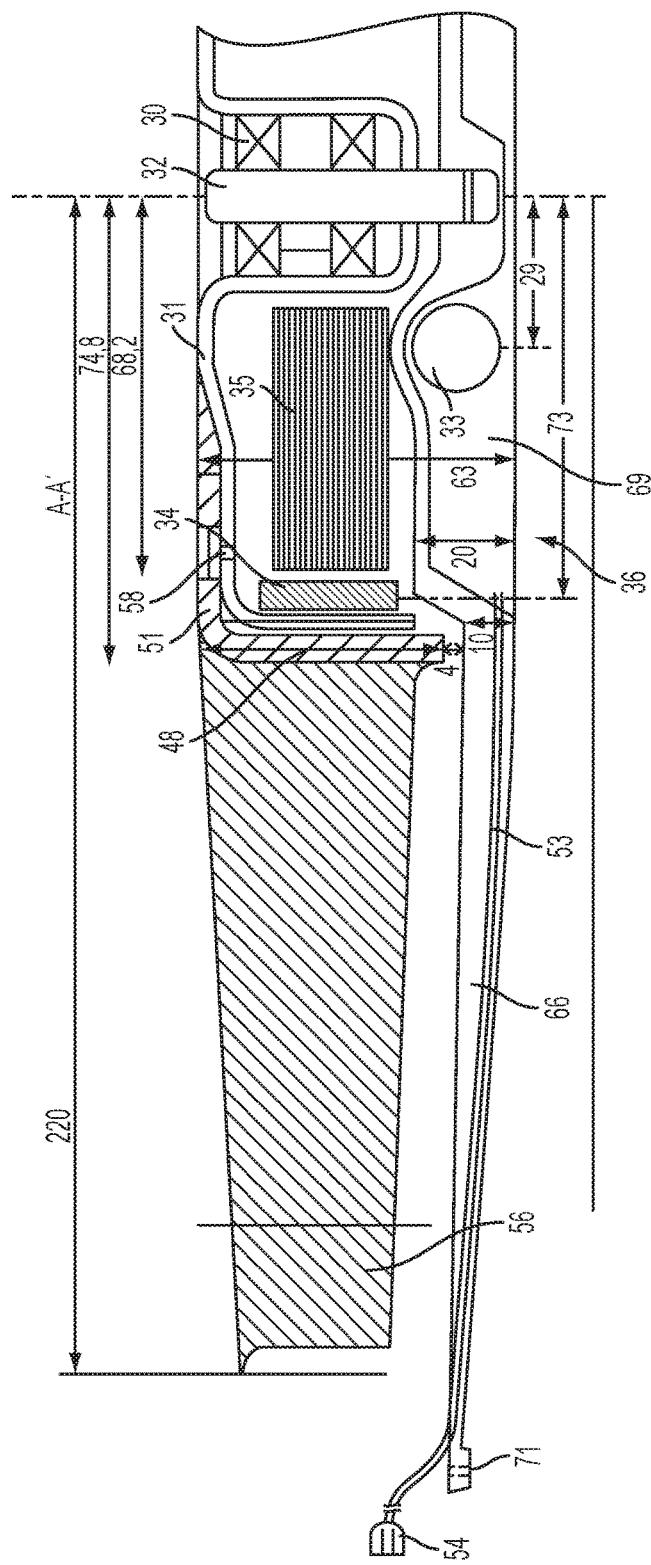
FIG. 20 show a sectional view of a cooling fan assembly in accordance with the present invention, having the stator struts extended as motor arm out of the stator body with the cabling embedded in the struts, shown with the electronics not fully shown but the electrolyte capacitor, with the capacitor(s) positioned flat, wherein the solenoid takes most of the lateral space, and with the whole motor-fan assembly having a length of about 63 mm, and with the motor bell having a size of about 73 mm.
Figure 23:
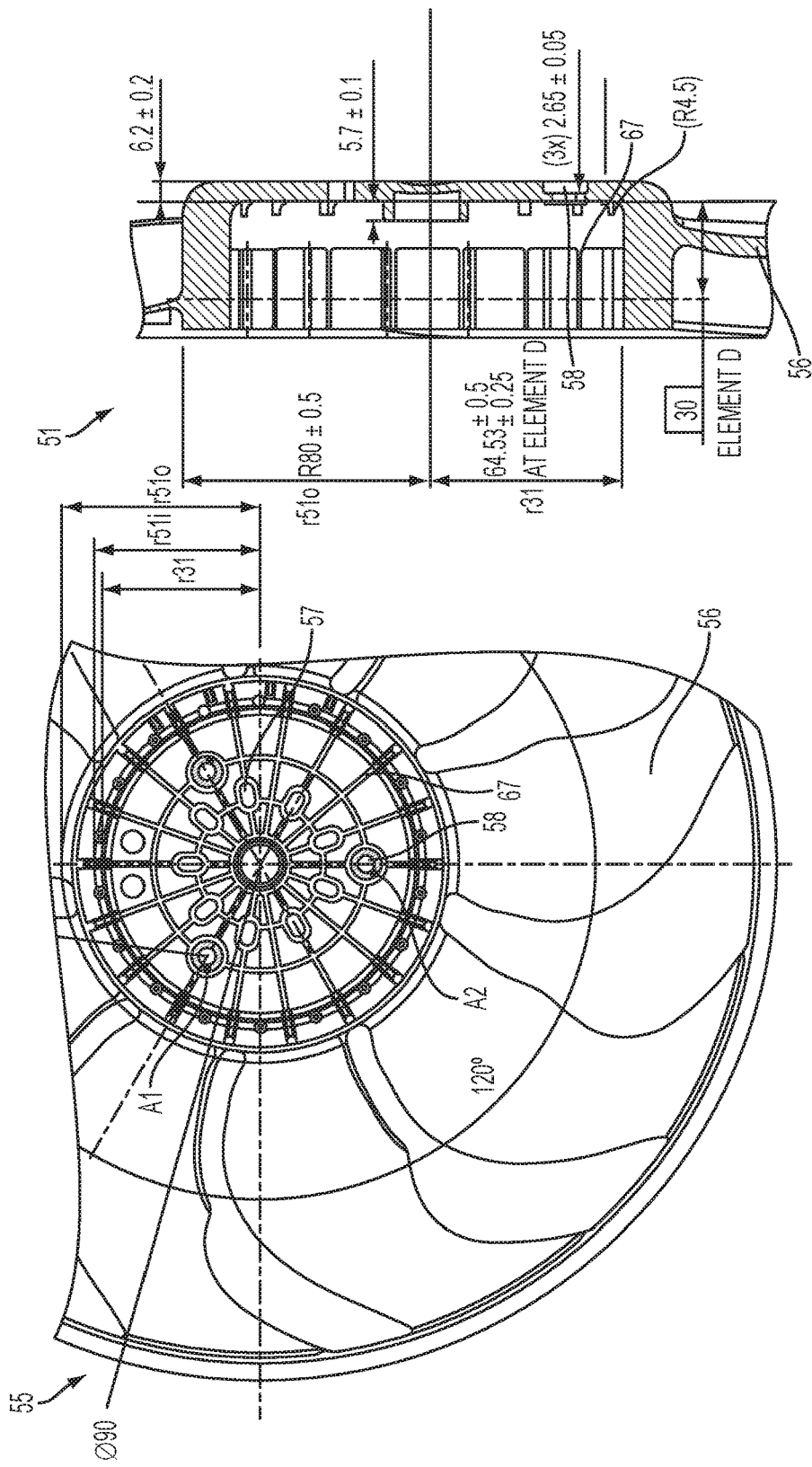
FIG. 23 shows a partial bottom view and a sectional view of a known blower.
Figure 24:
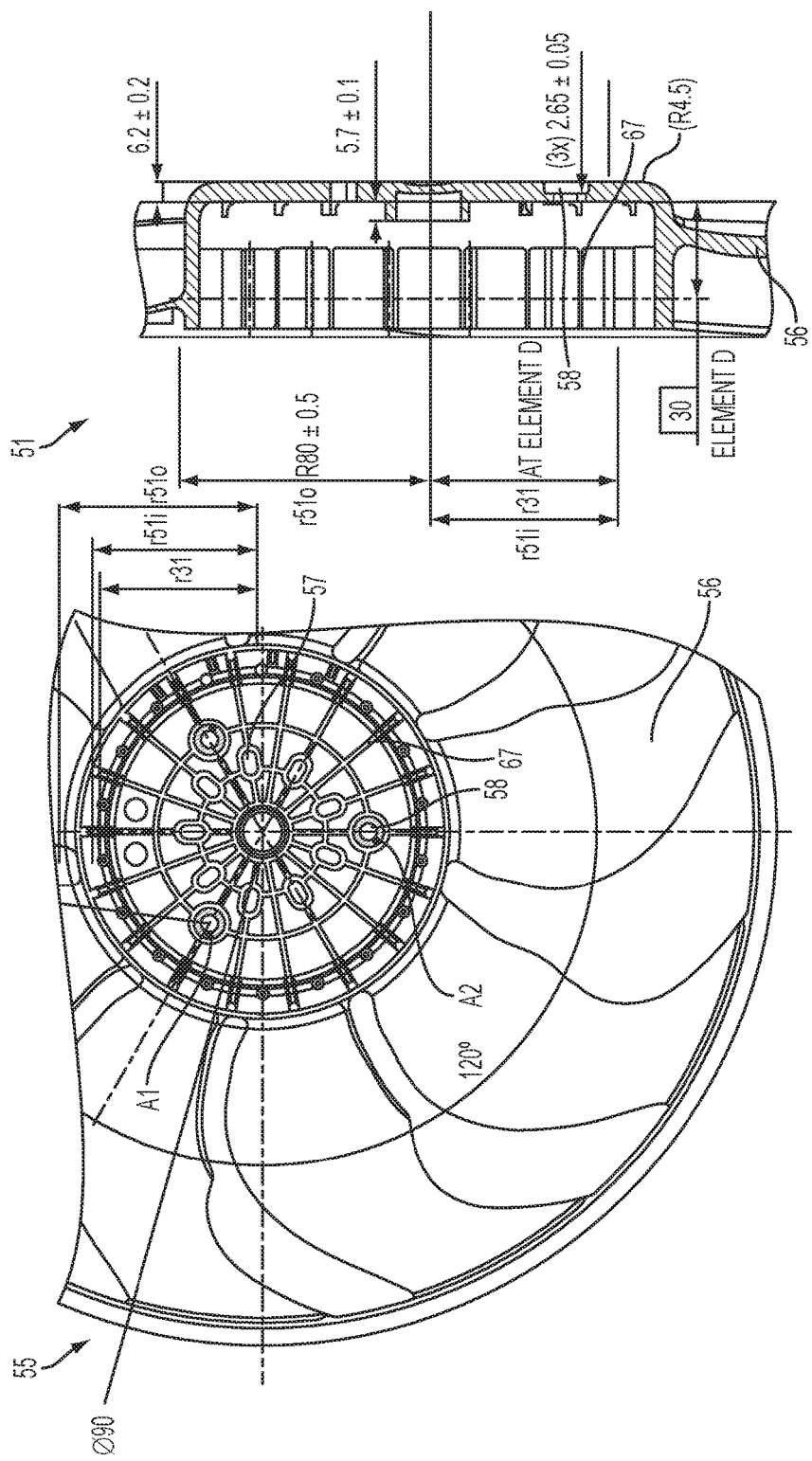
FIG. 24 shows a blower wheel of the present invention, with smaller enforcement ribs compared to the enforcement ribs of the known blower wheel shown in FIG. 23.

FIGS. 20-22 show a motor hub without enforcement ribs. The known cooling fan assemblies in FIGS. 13-16 all have enforcement ribs (although not visible in all of FIGS. 13-16). FIG. 23 shows a partial bottom view and a sectional view onto a known blower wheel which may find use in state of the art blower assemblies such as shown in FIGS. 13-16. FIG. 24 shows a blower wheel similar to the wheel shown in FIG. 23. The (outer) hub and fan size is identical. The hub can take a motor bell larger in diameter due to smaller enforcement ribs in accordance with the present invention, such as the motor bells shown in the FIGS. 21 and 22.

Figure 25:
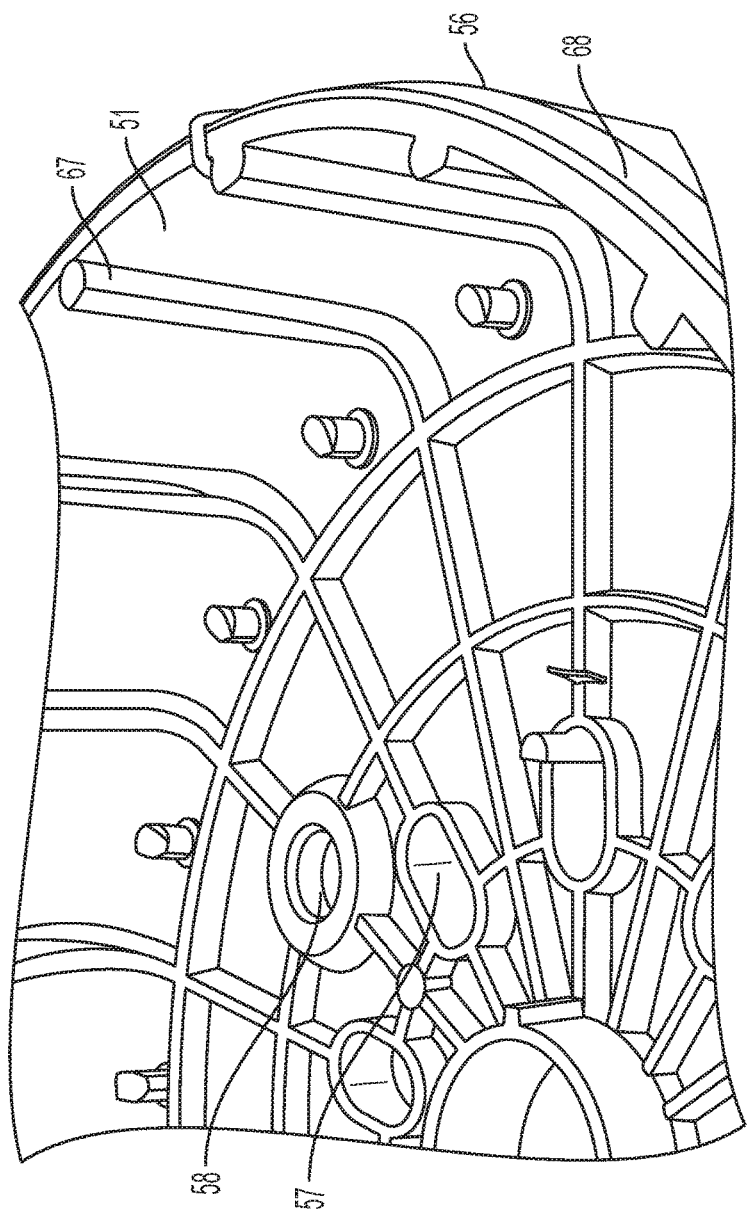
FIG. 25 shows a sample of a blower wheel hub with reduced size enforcement ribs on the inside and a circumferentially applied metal ring on the outside, in accordance with the present invention.
Figure 26:
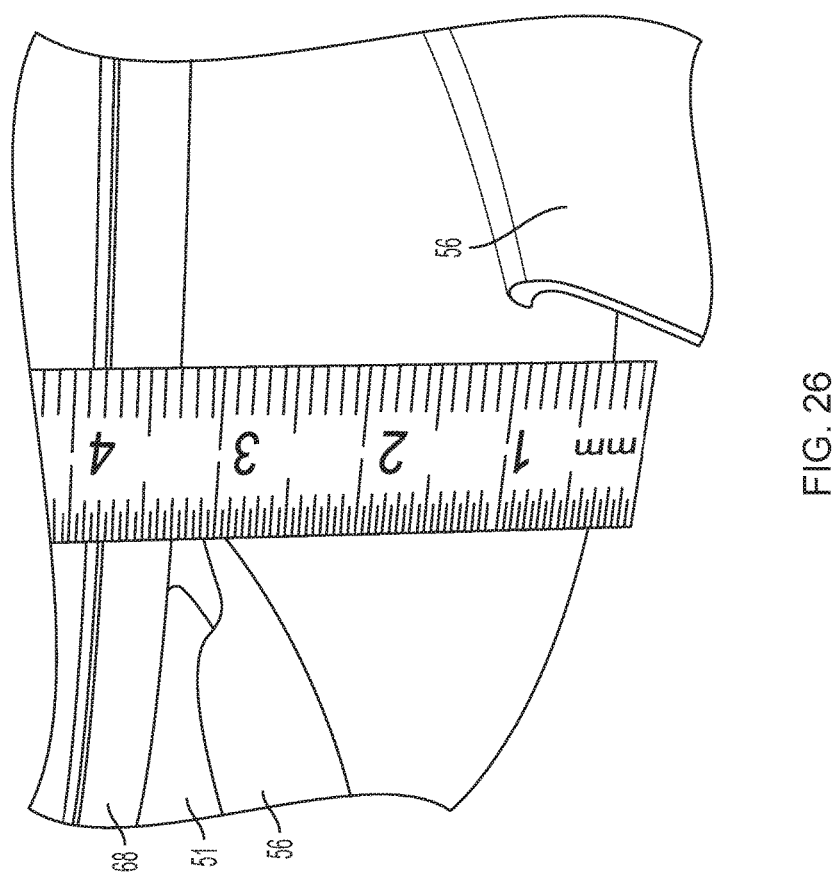
FIG. 26 is a close side view onto the hub of FIG. 25, showing a ruler to indicate the lengths.
Figure 27:
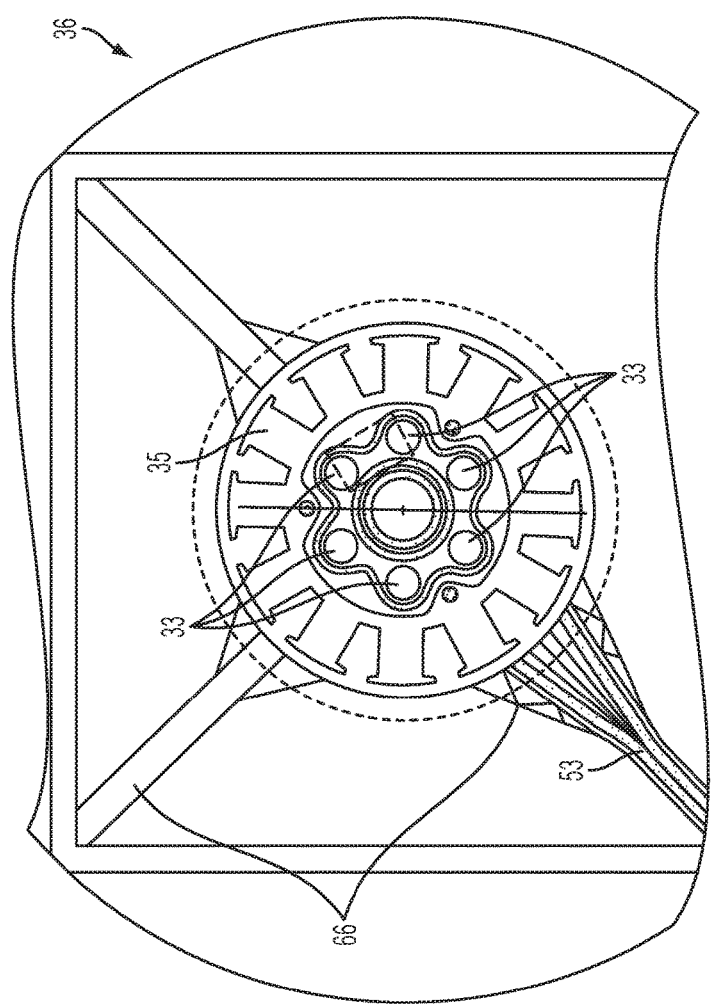
FIG. 27 shows an example of a different mounting position and number of stator arms for the assembly of the present invention, with the stator having 3 arms in an angle of 90 degrees.
Figure 28:
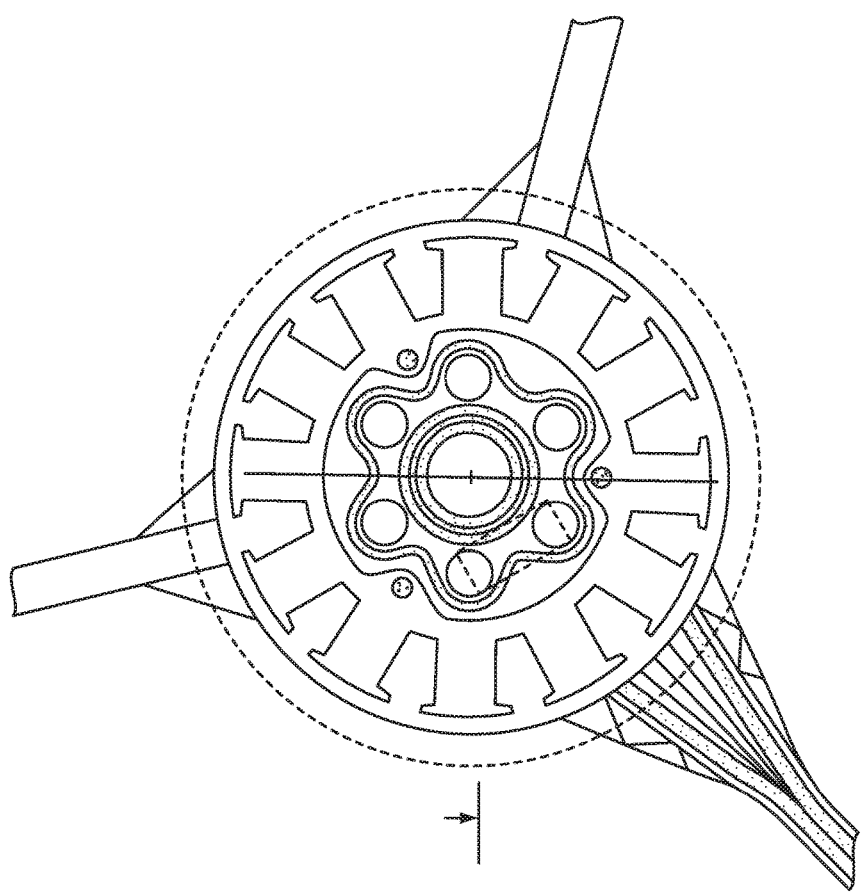
FIG. 28 shows an example of a different mounting position and number of stator arms for the assembly of the present invention, with the stator having 3 arms in an angle of 60 degrees.
Figure 29:
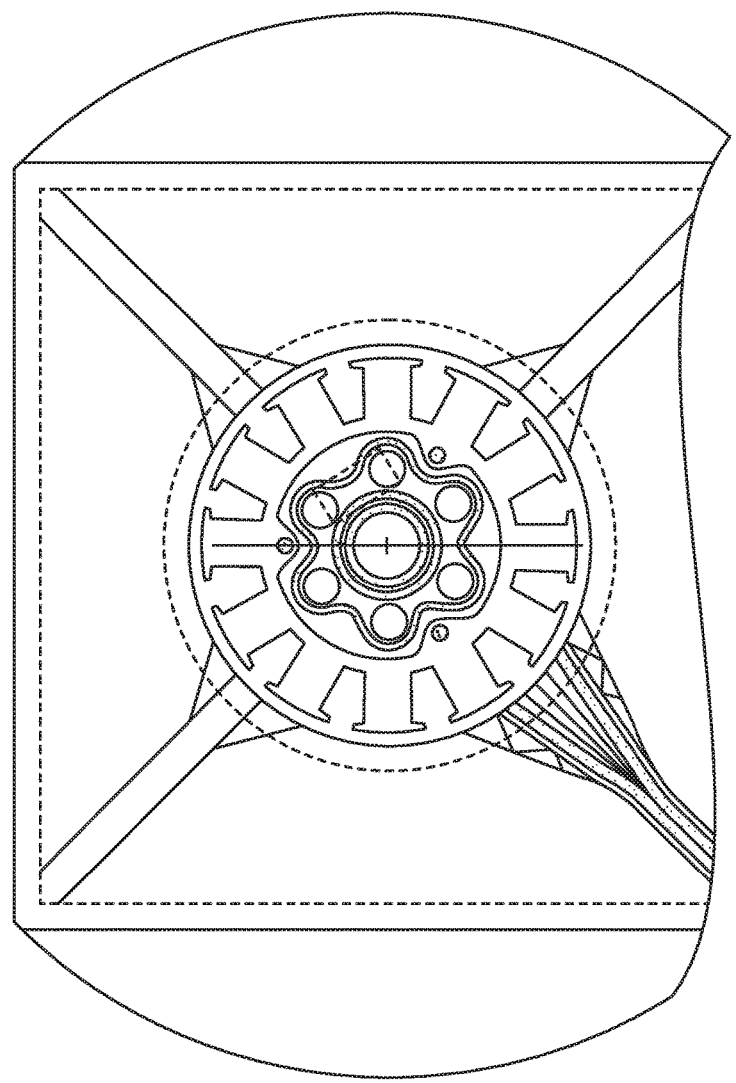
FIG. 29 shows an example of a different mounting position and number of stator arms for the assembly of the present invention, with the stator having 4 arms in an angle of 90 degrees.
Figure 30:
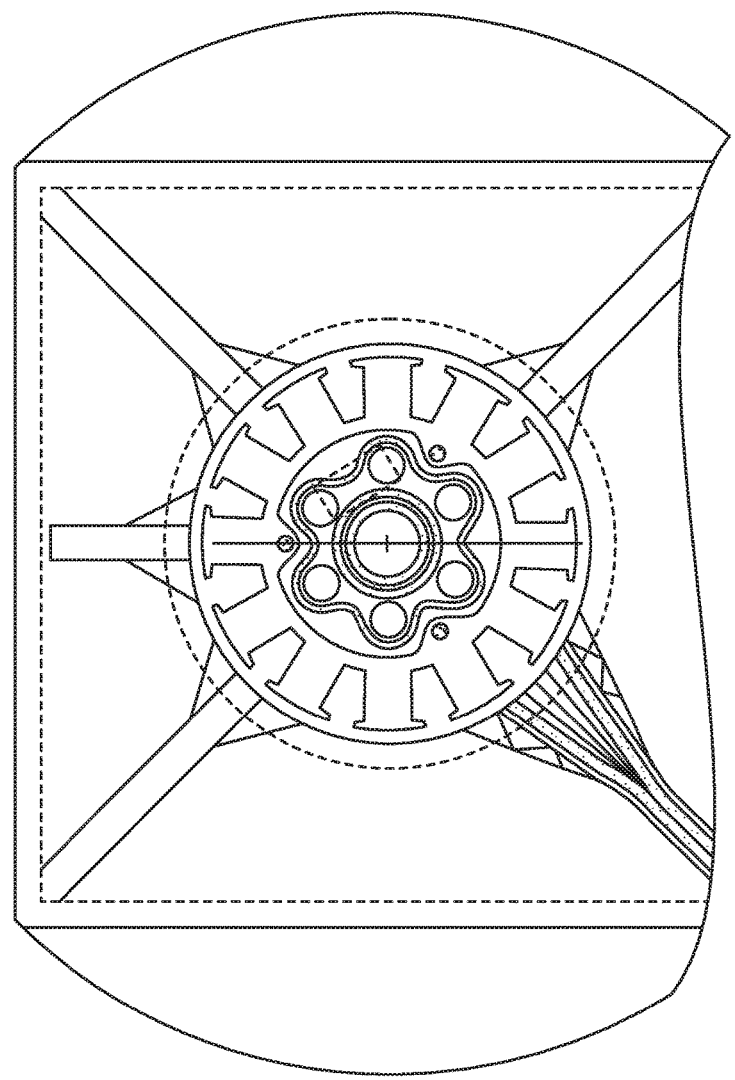
FIG. 30 shows an example of a different mounting position and number of stator arms for the assembly of the present invention, with the stator having 4 arms in an angle of 90 degrees plus a fifth arm at a 45 degree position.
Figure 31:
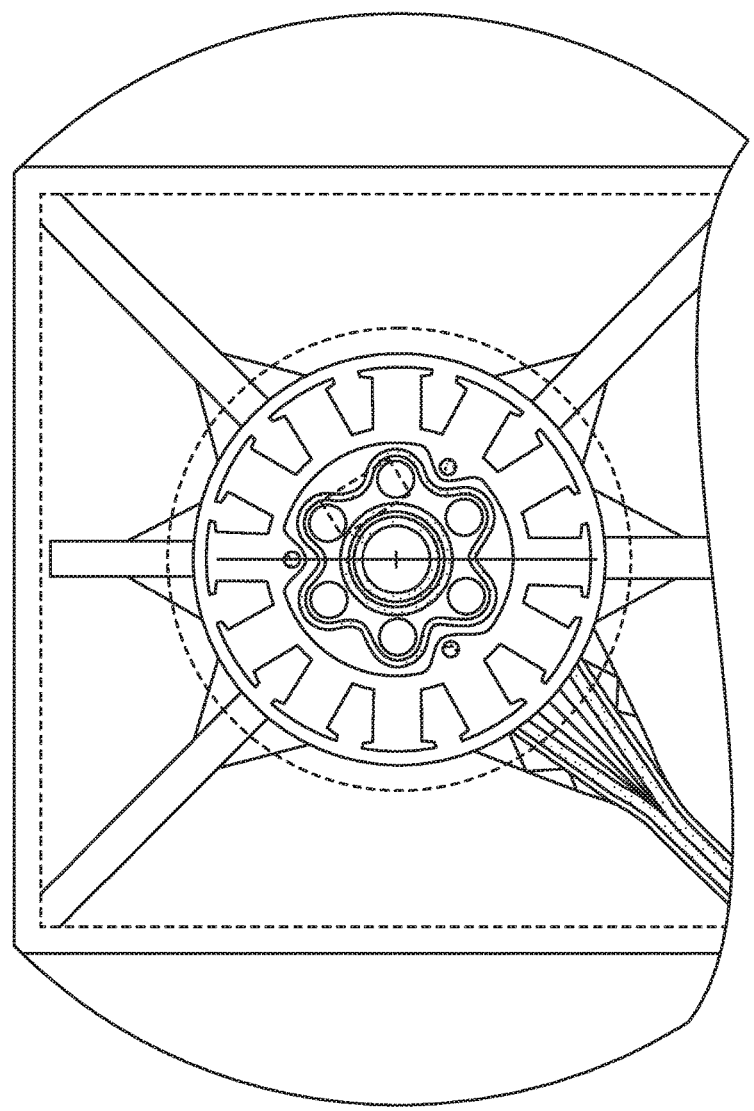
FIG. 31 shows an example of a different mounting position and number of stator arms for the assembly of the present invention, with the stator having 6 arms in different angles to each other.

The reduction of the enforcement ribs extension (as shown in FIG. 24 in comparison to FIG. 23) typically weakens the fans hub structural strengths. For achieving comparable strengths, the hub optionally may be enforced by adding an enforcement ring, which may be applied either around it (such as shown in FIGS. 25 and 26) or integrated to the fan hub's mold. The mounting enforcement ring material may be metal (such as a band of steel) or a fiber (such as carbon or glass fiber) reinforced material.

To further reduce the cooling fan assembly's height, the height may be reduced by reducing the space required by the electronics. Often the height is restrained by the electronics' inherent electrolyte capacitors. Their size, especially the length and diameter is restrained in the first place by the maximum current they can bear (and less restrained by the capacity). As another inventive option, a new type of capacitor may be used called polymer hybrid capacitors. These have less ESR. By that these can be built in about one half to one third the size of conventional electrolyte capacitors.

As another option, the capacitors may be arranged upright in the center of the stator assembly within the space which was created by putting the solenoids to a wider radius, such as can be seen in the sectional view of FIG. 22 and the top views of FIGS. 27-31. By that, the electronics compartment may be reduced to the highest restraining component different from the capacitors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A cooling fan assembly operable for cooling a radiator of a vehicle, said cooling fan assembly comprising:
 a brushless motor, wherein said brushless motor comprises a stator and a molded polymeric rotor;
 a fan element comprising a plurality of fan blades;
 wherein said fan element comprises a hub;
 wherein said hub of said fan element is attached at said rotor such that rotation of said rotor by said motor imparts rotation of said fan blades;
 wherein said molded polymeric rotor is and formed by injection molding a thermoplastic material and comprises a plurality of magnetic elements disposed at an inside facing surface; wherein said rotor circumscribes said stator; and
 wherein, during injection molding of said molded polymeric rotor, said magnetic elements are at least partially overmolded by said thermoplastic material so as to be in direct contact with said thermoplastic material to establish said magnetic elements at an inside facing surface of said molded polymeric rotor that circumscribes said stator.

2. The cooling fan assembly of claim 1, wherein said thermoplastic material comprises an engineering resin.

3. The cooling fan assembly of claim 2, wherein said molded polymeric rotor comprises a magnetic permeable property.

4. The cooling fan assembly of claim 3, wherein said magnetic permeable property is achieved by mixing magnetic permeable particles into said thermoplastic material.

5. The cooling fan assembly of claim 1, wherein said molded polymeric rotor has at least one metallic element insert molded therein.

6. The cooling fan assembly of claim 5, wherein attachment of said fan element to said molded polymeric rotor is made via at least one fastener attaching at said at least one metallic element.

7. The cooling fan assembly of claim 1, wherein said fan element comprises a molded polymeric fan element.

8. The cooling fan assembly of claim 7, wherein attachment of said fan element to said molded polymeric rotor is made via unitarily molding said molded polymeric rotor and at least a portion of said molded polymeric fan element as a single molded unit.

9. The cooling fan assembly of claim 1, wherein said stator of said motor is fixedly attached at a frame of said cooling fan assembly, and wherein said frame is configured for mounting said cooling fan assembly at the vehicle, and wherein a plurality of mounting arms extend from said stator to a perimeter region of said frame to mount said motor at said frame.

10. The cooling fan assembly of claim 9, wherein said mounting arms are press fit attached at said stator.

11. A cooling fan assembly operable for cooling a radiator of a vehicle, said cooling fan assembly comprising:
- a brushless motor, wherein said brushless motor comprises a stator and a rotor;
- a fan element comprising a plurality of fan blades, wherein said fan element comprises a molded polymeric fan element;
- wherein said fan element comprises a hub;
- wherein said hub of said fan element is attached at said rotor such that rotation of said rotor by said motor imparts rotation of said fan blades;
- wherein said rotor comprises a molded polymeric rotor formed by injection molding a thermoplastic material;
- wherein, during injection molding of said rotor, a plurality of magnetic elements are at least partially overmolded by said thermoplastic material so as to be in direct contact with said thermoplastic material to establish said magnetic elements at said molded polymeric rotor; and
- wherein said rotor has a bell shape that circumscribes said stator, and wherein said magnetic elements are disposed in direct contact with an inside facing surface of said rotor that circumscribes said stator.

12. The cooling fan assembly of claim 11, wherein said molded polymeric rotor has at least one metallic element insert molded therein, and wherein attachment of said fan element to said molded polymeric rotor is made via at least one fastener attaching at said at least one metallic element.

13. The cooling fan assembly of claim 11, wherein attachment of said fan element to said molded polymeric rotor is made via unitarily molding said molded polymeric rotor and at least a portion of said molded polymeric fan element as a single molded unit.

14. The cooling fan assembly of claim 11, wherein said stator of said motor is fixedly attached at a frame of said cooling fan assembly, and wherein said frame is configured for mounting said cooling fan assembly at the vehicle.

15. The cooling fan assembly of claim 14, wherein a plurality of mounting arms extend from said stator to a perimeter region of said frame to mount said motor at said frame, and wherein said mounting arms are press fit attached at said stator.

16. A cooling fan assembly operable for cooling a radiator of a vehicle, said cooling fan assembly comprising:
- a brushless motor, wherein said brushless motor comprises a stator and a rotor;
- a fan element comprising a plurality of fan blades;
- wherein said fan element comprises a hub;
- wherein said hub of said fan element is attached at said rotor such that rotation of said rotor by said motor imparts rotation of said fan blades;
- wherein said rotor comprises a molded polymeric rotor formed by injection molding a thermoplastic material, and wherein said thermoplastic material comprises an engineering resin;
- wherein, during injection molding of said rotor, a plurality of magnetic elements are at least partially overmolded by said thermoplastic material so as to be in direct contact with said thermoplastic material to establish said magnetic elements at said molded polymeric rotor to unitarily form said molded polymeric rotor structure; and
- wherein said magnetic elements in direct contact with are disposed an inside facing surface of said rotor that circumscribes said stator.

17. The cooling fan assembly of claim 16, wherein said molded polymeric rotor has at least one metallic element insert molded therein, and wherein attachment of said fan element to said molded polymeric rotor is made via at least one fastener attaching at said at least one metallic element.

18. The cooling fan assembly of claim 16, wherein said fan element comprises a molded polymeric fan element, and wherein attachment of said fan element to said molded polymeric rotor is made via unitarily molding said molded polymeric rotor and at least a portion of said molded polymeric fan element as a single molded unit.

19. The cooling fan assembly of claim 16, wherein said stator of said motor is fixedly attached at a frame of said cooling fan assembly, and wherein said frame is configured for mounting said cooling fan assembly at the vehicle, and wherein a plurality of mounting arms extend from said stator to a perimeter region of said frame to mount said motor at said frame, and wherein said mounting arms are press fit attached at said stator.

* * * * *

UNITED STATES PATENT AND TRADEMARK OFFICE
CERTIFICATE OF CORRECTION

PATENT NO. : 10,253,676 B2  
APPLICATION NO. : 14/572018  
DATED : April 9, 2019  
INVENTOR(S) : Axel Gossling et al.

Page 1 of 1

It is certified that error appears in the above-identified patent and that said Letters Patent is hereby corrected as shown below:

In the Claims

Column 8
Claim 1, Line 34, remove "and" after "rotor is"

Column 10
Claim 16, Line 25, remove "in direct contact with"
Claim 16, Line 26, insert --in direct contact with-- after the word "disposed"

Signed and Sealed this
Twenty-eighth Day of May, 2019

Andrei Iancu
*Director of the United States Patent and Trademark Office*